US011887391B2

(12) United States Patent
Yoshihashi et al.

(10) Patent No.: US 11,887,391 B2
(45) Date of Patent: Jan. 30, 2024

(54) INFORMATION PROCESSING SYSTEM, DATA OUTPUT SYSTEM, IMAGE PROCESSING METHOD, AND RECORDING MEDIUM

(71) Applicants: Ryohsuke Yoshihashi, Kanagawa (JP); Tomoya Amikura, Kanagawa (JP); Kazuaki Kidoguchi, Saitama (JP); Kohji Yamamoto, Kanagawa (JP); Kohji Kambara, Tokyo (JP)

(72) Inventors: Ryohsuke Yoshihashi, Kanagawa (JP); Tomoya Amikura, Kanagawa (JP); Kazuaki Kidoguchi, Saitama (JP); Kohji Yamamoto, Kanagawa (JP); Kohji Kambara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/357,148

(22) Filed: Jun. 24, 2021

(65) Prior Publication Data
US 2021/0409555 A1 Dec. 30, 2021

(30) Foreign Application Priority Data

Jun. 30, 2020 (JP) .................. 2020-113443
Jun. 30, 2020 (JP) .................. 2020-113444
Dec. 25, 2020 (JP) .................. 2020-217752

(51) Int. Cl.
*G06V 30/412* (2022.01)
*G06F 3/04817* (2022.01)
(Continued)

(52) U.S. Cl.
CPC ........ *G06V 30/412* (2022.01); *G06F 3/04817* (2013.01); *G06V 30/1456* (2022.01);
(Continued)

(58) Field of Classification Search
CPC ............ H04N 1/00209; H04N 1/00005; G06F 3/04817; G06V 10/22; G06V 30/10;
(Continued)

(56) References Cited

U.S. PATENT DOCUMENTS 9,129,197 B1 9/2015 Madhani et al.
2004/0117258 A1 6/2004 Kanbara
(Continued)

FOREIGN PATENT DOCUMENTS

EP 2772871 A2 9/2014
JP H11167532 A 6/1999
(Continued)

OTHER PUBLICATIONS

Extended European Search Report dated Dec. 3, 2021 for corresponding European Application No. 21180461.2.
(Continued)

*Primary Examiner* — King Y Poon
*Assistant Examiner* — Michael L Burleson
(74) *Attorney, Agent, or Firm* — Harness, Dickey & Pierce, P.L.C.

(57) ABSTRACT

An apparatus, system, and method, each of which associates a region subjected to image processing with identification information, receives, in response to a device accepting selection from a user, the identification information and image data from the device, and outputs a result of the image processing performed on the region subjected to image processing associated with the identification information.

16 Claims, 33 Drawing Sheets

(51) Int. Cl.
*H04N 1/00* (2006.01)
*G06V 30/14* (2022.01)
*G06V 30/10* (2022.01)

(52) U.S. Cl.
CPC ..... *H04N 1/00005* (2013.01); *H04N 1/00209* (2013.01); *H04N 1/00244* (2013.01); *G06T 2207/10008* (2013.01); *G06T 2207/30176* (2013.01); *G06V 30/10* (2022.01)

(58) Field of Classification Search
CPC .............. G06V 30/1456; G06V 30/412; G06T 2207/10008; G06T 2207/30176; G06T 11/60
See application file for complete search history.

(56) References Cited

U.S. PATENT DOCUMENTS

| | | |
|---|---|---|
| 2006/0167899 A1 | 7/2006 | Nagahashi et al. |
| 2006/0168005 A1 | 7/2006 | Kanbara et al. |
| 2006/0173904 A1 | 8/2006 | Nakajima |
| 2006/0197980 A1 | 9/2006 | Kanbara |
| 2006/0236143 A1 | 10/2006 | Kidoguchi |
| 2009/0174892 A1 | 7/2009 | Yamamoto |
| 2010/0231939 A1 | 9/2010 | Yamamoto et al. |
| 2010/0302604 A1 | 12/2010 | Kodimer et al. |
| 2011/0135336 A1 | 6/2011 | Yamamoto |
| 2014/0168478 A1* | 6/2014 | Baheti ................ G06V 30/1456 348/240.99 |
| 2014/0201759 A1 | 7/2014 | Amikura |
| 2016/0269586 A1* | 9/2016 | Nanaumi ............. G06V 10/235 |
| 2017/0127278 A1 | 5/2017 | Yamamoto et al. |
| 2017/0132604 A1 | 5/2017 | Kawakami et al. |
| 2017/0308507 A1 | 10/2017 | Shintani |
| 2018/0013913 A1 | 1/2018 | Hayashi et al. |
| 2018/0253782 A1* | 9/2018 | Mengerink ........ G06Q 30/0635 |
| 2018/0270395 A1 | 9/2018 | Yamamoto et al. |
| 2018/0349078 A1 | 12/2018 | Yoshihashi |
| 2018/0373711 A1 | 12/2018 | Ghatage et al. |
| 2019/0026579 A1* | 1/2019 | Hall ................... G06V 30/2253 |
| 2020/0162636 A1 | 5/2020 | Yoshihashi |
| 2020/0210057 A1 | 7/2020 | Yoshihashi |
| 2020/0257481 A1 | 8/2020 | Yoshihashi |

FOREIGN PATENT DOCUMENTS

| | | |
|---|---|---|
| JP | 2006/202081 A | 8/2006 |
| JP | 2006/209542 A | 8/2006 |
| JP | 2012/049668 A | 3/2012 |
| JP | 2017/087572 A | 5/2017 |
| JP | 2017-212575 | 11/2017 |
| JP | 2018-014079 | 1/2018 |
| JP | 2018191032 A | 11/2018 |
| JP | 2019/057307 A | 4/2019 |

OTHER PUBLICATIONS

Office Action dated Apr. 26, 2022, issued in corresponding Japanese Patent Application No. 2020-217752.

* cited by examiner

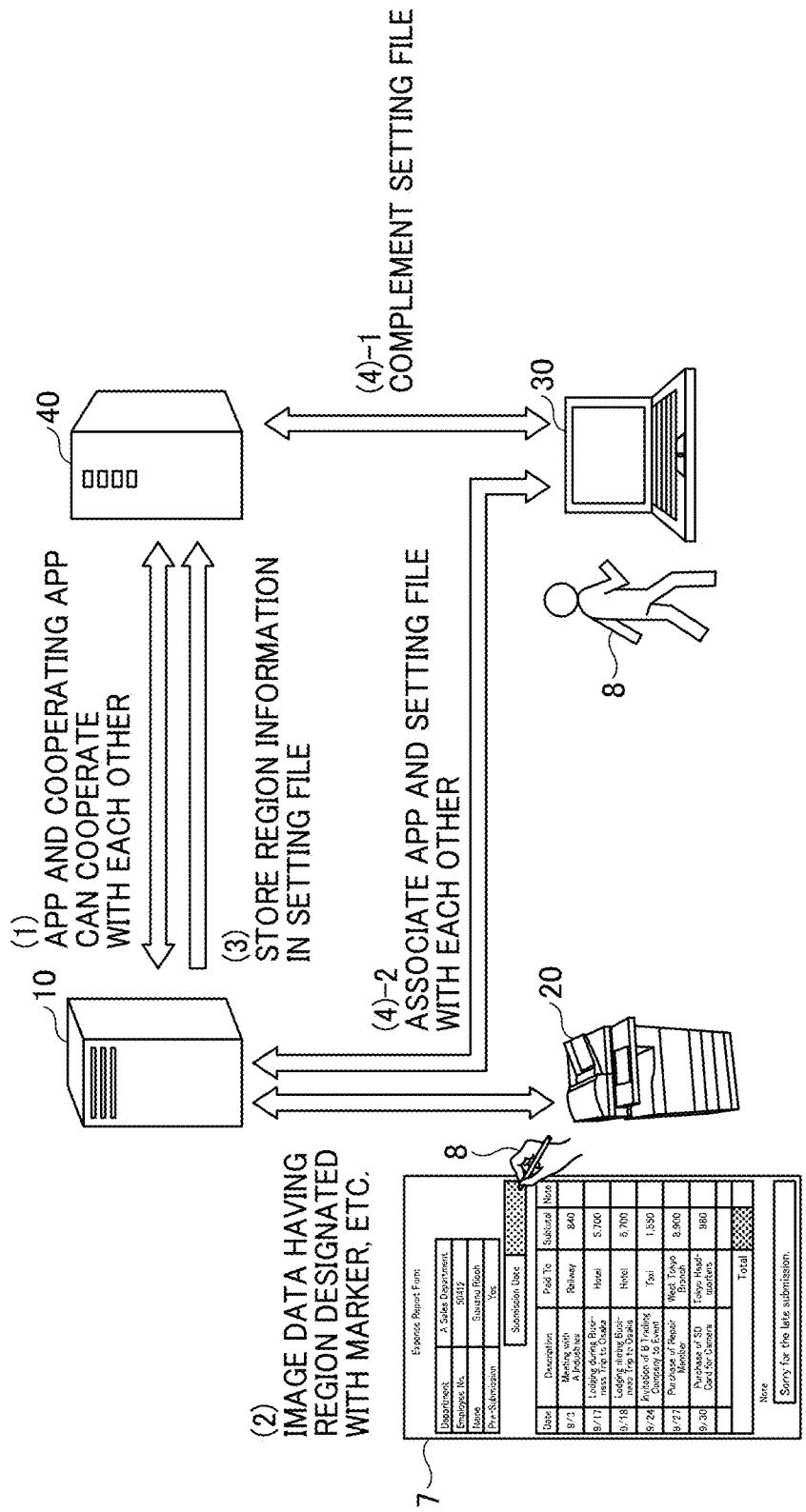

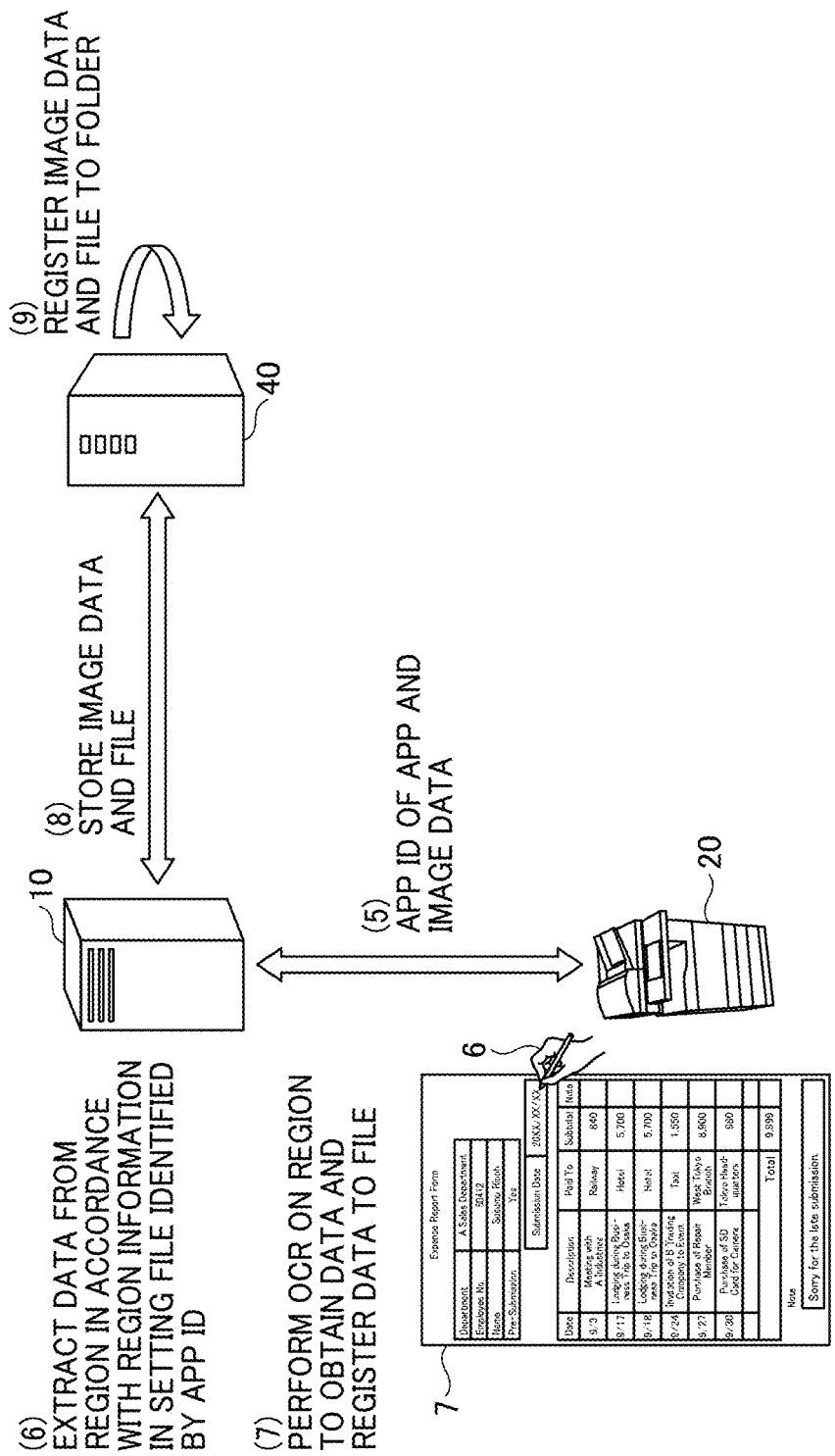

FIG. 6

```
{
  "flowId" : "flow001",                    }1201A
  "flowName" : "Expense Report",           }1202A      1203A
  "flowDetails" : [
      {
              "component" : "ExService_B",
              "parameters" :{                          }1223A
                      "AppId" : "2575"
                      "Folder" : "/ExpenseReportFormStorageLocation/"
              }
      }
  ]
}
```

FIG. 8B

| Expense Report Form | |
|---|---|
| Department | A Sales Department |
| Employee No. | 50412 |
| Name | Susumu Ricoh |
| Pre-Submission | Yes |
| Submission Date | 2020/01/01 |

| Date | Description | Paid To | Subtotal | Note |
|---|---|---|---|---|
| 9/3 | Meeting with A Industries | Railway | 840 | |
| 9/17 | Lodging during Business Trip to Osaka | Hotel | 5,700 | |
| 9/18 | Lodging during Business Trip to Osaka | Hotel | 5,700 | |
| 9/24 | Invitation of B Trading Company to Event | Taxi | 1,550 | |
| 9/27 | Purchase of Repair Member | West Tokyo Branch | 8,900 | |
| 9/30 | Purchase of SD Card for Camera | Tokyo Headquarters | 980 | |
| | | | | |
| | | Total | 23,670 | |

Note

Sorry for the late submission.

| A | B | C | D | E | F | G | H | I | K | L |
|---|---|---|---|---|---|---|---|---|---|---|
| ID | Start X coordinate | Start Y coordinate | End X coordinate | End Y coordinate | Format | CSV column name | CSV position (column) | CSV position (start row) | OCR language | Order used in file name |
| 1 | 47 | 39 | 87 | 46 | | Document name | | | Japanese | 1 |
| 2 | 127 | 78 | 185 | 90 | YYYY/MM/DD | Submission date | 3 | 2 | English | 2 |
| 3 | 126 | 171 | 151 | 178 | numeric | Subtotal | 4 | 2 | English | |

FIG. 13

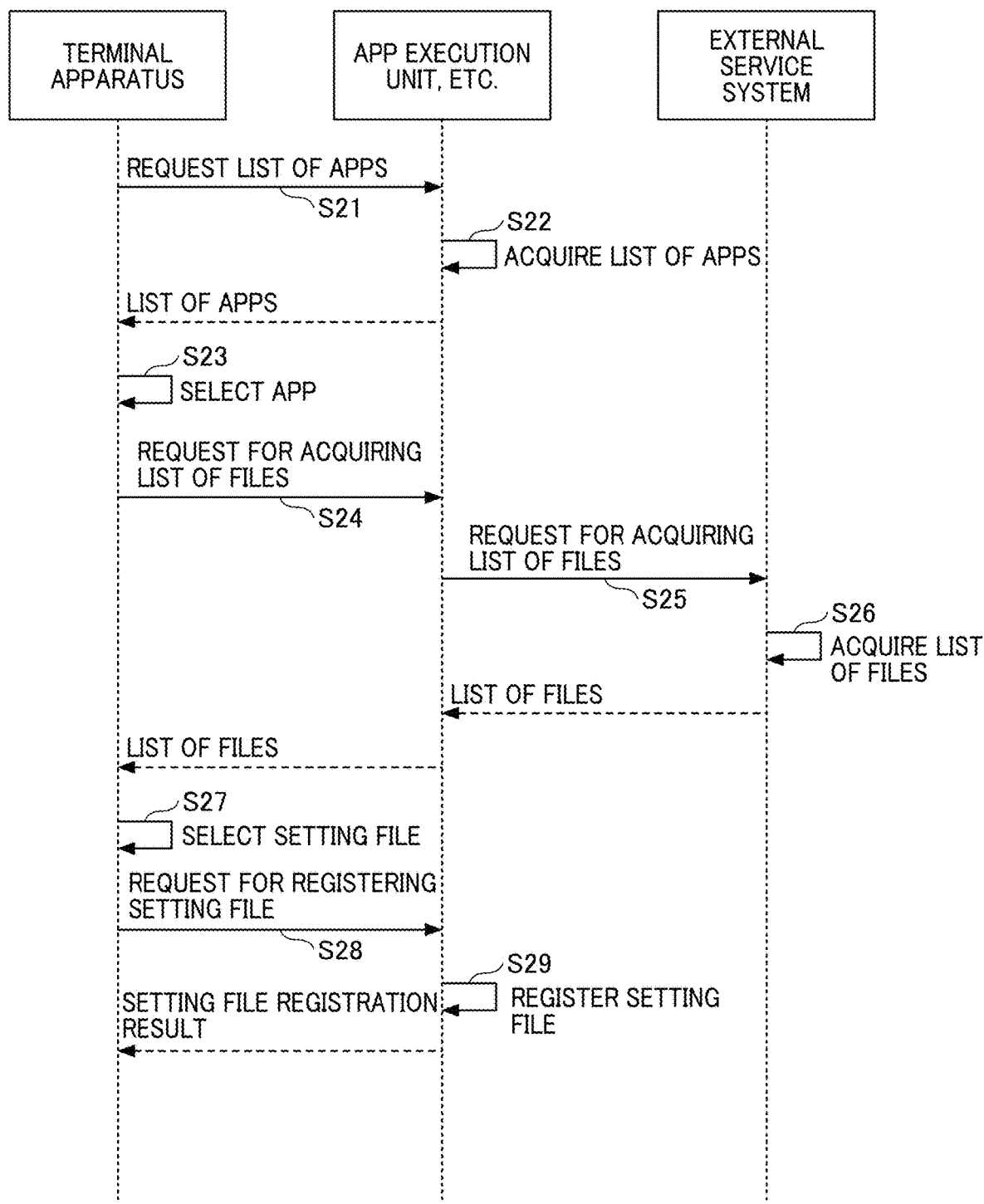

FIG. 20 B (2)

Expense Report Form

| Department | A Sales Department |
|---|---|
| Employee No. | 50412 |
| Name | Susumu Ricoh |
| Pre-Submission | Yes |

| Submission Date | 2020/01/01 |
|---|---|

| Date | Description | Paid To | Subtotal | Note |
|---|---|---|---|---|
| 9/3 | Meeting with A Industries | Railway | 840 | |
| 9/17 | Lodging during Business Trip to Osaka | Hotel | 5,700 | |
| 9/18 | Lodging during Business Trip to Osaka | Hotel | 5,700 | |
| 9/24 | Invitation of B Trading Company to Event | Taxi | 1,550 | |
| 9/27 | Purchase of Repair Member | West Tokyo Branch | 8,900 | |
| 9/30 | Purchase of SD Card for Camera | Tokyo Headquarters | 980 | |
| | | | | |
| | | Total | 23,670 | |

Note

Sorry for the late submission.

FIG. 20C
2. Position the original and press start button
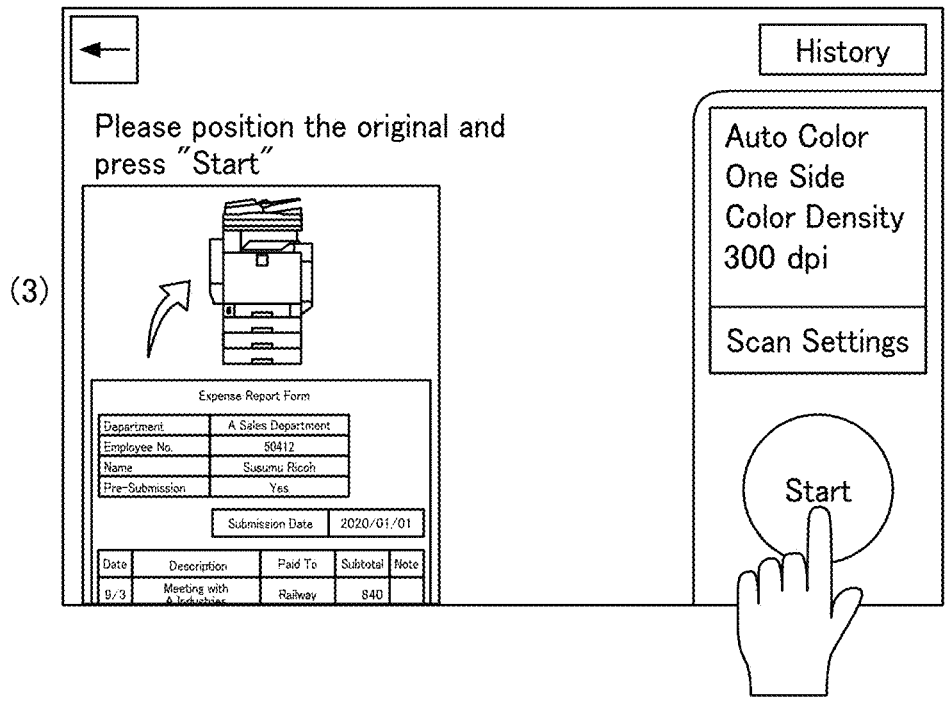
FIG. 21A
My Drive > ExpenseReportForm StorageLocation
FIG. 21B
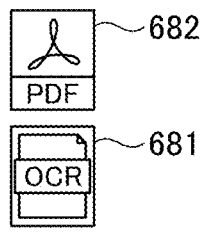

| FIG. 22A |
| FIG. 22B |

FIG. 24A

My Drive > ExpenseReportFormStorageLocation ▼ ~670

| Name ↑ | | Owner | Last modified | File size |
|---|---|---|---|---|
| PDF | ExpenseReportForm_20200520.pdf ~671 | me | 11:29 AM me | 20 MB |
| X | ExpenseReportForm_20200520.csv ~672 | me | 11:29 AM me | 10 KB |

FIG. 24B

| | A | B |
|---|---|---|
| 1 | Submission date | Subtotal |
| 2 | 2020/1/28 | 1,400 |
| 3 | | |
| 4 | ... | ... |

FIG. 26A

WHEN FORMS TO BE REGISTERED ARE COLLECTIVELY SCANNED

| Submission date | | | 2020/01/28 | |
|---|---|---|---|---|
| Date | Description | Paid To | Subtotal | Note |
| 1/6 | Meeting with XX Corporation | Railway | 840 | |
| 1/7 | Clear files | Convenience Store | 560 | |
| | | | | |
| | | | | |
| | | | | |
| | | | | |
| | | Total | 1,400 | |

| Submission date | | | 2020/01/21 | |
|---|---|---|---|---|
| Date | Description | Paid To | Subtotal | Note |
| 1/6 | Taxi Fare | Taxi | 2,340 | |
| 1/7 | Lodging | Hotel | 8,200 | |
| | | | | |
| | | | | |
| | | | | |
| | | | | |
| | | Total | 10,540 | |

FIG. 26B

|   | A | B |   |
|---|---|---|---|
| 1 | Submission date | Subtotal |   |
| 2 | 2020/1/28 | 1,400 | OCR RESULT OF FIRST FORM |
| 3 | 2020/1/21 | 10,540 | OCR RESULT OF SECOND FORM |
| 4 | ⋮ | ⋮ |   |

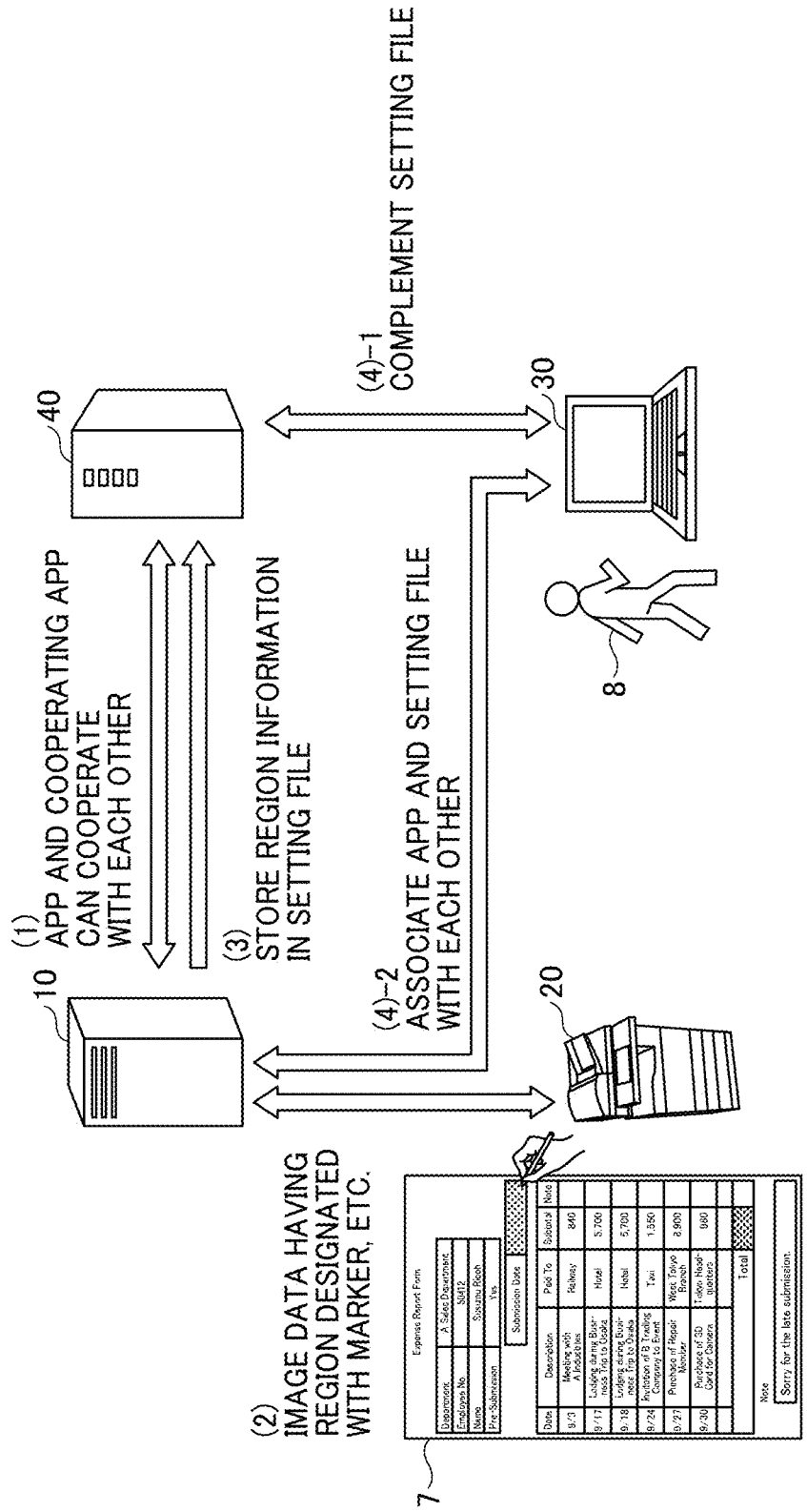

FIG. 28
| APP ID | ICON (SCREEN INFORMATION) | REGION INFORMATION (fileName) |
|---|---|---|
| app003 | EXPENSE REPORT FORM  | /My_Drive/ExpenseReportForm_SettingFile.csv |
| app004 | ORDER FORM 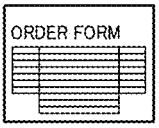 | /My_Drive/OrderForm_SettingFile.csv |

INFORMATION PROCESSING SYSTEM, DATA OUTPUT SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2020-113443, filed on Jun. 30, 2020, 2020-113444, filed on Jun. 30, 2020, and 2020-217752, filed on Dec. 25, 2020, in the Japan Patent Office, the entire disclosure of which is hereby incorporated by reference herein.

BACKGROUND

Technical Field

The present disclosure relates to an information processing system, a data output system, an image processing method, and a recording medium.

Related Art

In daily work at organizations such as companies or parties, processing of forms such as expense report forms, invoice forms, or order forms often occurs. A person in charge at an organization daily performs work of extracting the dates, the case numbers, the subtotals, or the like from forms or of totaling the numbers.

A technique of digitizing such forms has been proposed (see, for example, Japanese Unexamined Patent Application Publication No. 2017-212575-A). JP-2017-212575-A discloses an image scanning apparatus that scans, with a multifunction peripheral (MFP), a form having a to-be-masked region marked by a user and that registers resulting image data of the form having the masked region to a main system or the like.

However, the technique of the related art has a disadvantage in that a result of optical character recognition/reader (OCR) processing performed on a predetermined region in image data is not output. For example, when users at an organization report expenses, the users fill in the expenses on expense report forms and submit the expense report forms to a general affairs department. Even if these forms are scanned with an MFP to be digitized into pieces of image data, a person in charge still needs to read data such as the dates and the expenses from fixed regions in all the pieces of image data of the forms submitted by the users and record the data in a file.

In view of such a disadvantage, an embodiment of the present disclosure provides a system capable of outputting a result of OCR processing performed on a predetermined region in image data.

The technique of the related art also has a disadvantage in that image processing is not performed on a region in image data in response to selection of identification information. For example, there is a system in which, in response to a user pressing an image such as an icon or a button displayed by a device, the device scans a form, digitizes the form into image data, and registers the image data to a server. However, this system is incapable of performing image processing on a predetermined region in the image data obtained by digitization.

In view of such a disadvantage, an embodiment of the present disclosure provides a system that performs image processing on a region in image data in response to selection of identification information.

SUMMARY

According to one aspect, an information processing system capable of communicating with a device. The information processing system includes circuitry that receives image data from the device, and identifies an OCR region of the image data, based on a region in which predetermined information is detected. The circuitry outputs data obtained by performing OCR processing on the OCR region of the image data.

According to one aspect, a data output system including the above-described information processing system is provided.

According to one aspect, a data output method is provided, which includes receiving image data from the device; identifying an OCR region of the image data, based on a region in which predetermined information is detected; and outputting data, the output data being obtained by performing OCR processing on the identified OCR region of the image data.

According to one aspect, a recording medium storing computer program code for controlling a computer system to carry out the above-described method is provided.

With the above-described configuration, the system is capable of outputting a result of OCR processing performed on a predetermined region in image data.

According to one aspect, a data output system includes an information processing system capable of communicating with a device via a network. The device includes circuitry that transmits, in response to acceptance of selection from a user, identification information and image data to the information processing system. The information processing system includes circuitry that associates a region subjected to image processing with the identification information, and outputs a result of image processing on the region subjected to image processing and associated with the identification information.

According to one aspect, the above-described information processing system is provided.

According to one aspect, an image processing method is provided, which includes associating a region subjected to image processing with identification information; receiving, in response to a device accepting selection from a user, the identification information and image data from the device; and outputting a result of the image processing performed on the region subjected to image processing associated with the identification information.

According to one aspect, a recording medium storing computer program code for controlling a computer system to carry out the above-described method is provided.

With the above-described configuration, the system is capable of performing image processing on a region in image data in response to selection of identification information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A and 1B are diagrams describing a process or operation in which a data output system creates a file based on data acquired from a form;

FIG. 6 is a diagram illustrating an example of application (hereinafter, abbreviated as app) processing information stored in an app processing information storage unit;

FIGS. 8A and 8B are diagrams describing a method for marking a region on a form;

FIG. 13 is a diagram describing an example of a correspondence between the setting file and the form;

FIG. 15 is a sequence diagram illustrating an example of a process in which the administrator associates an app and a setting file with each other;

FIGS. 20A to 20C are diagrams illustrating an example of transition of screens displayed by the device;

FIGS. 21A and 21B are diagrams describing an example of files stored in an external service system;

FIGS. 24A and 24B are diagrams illustrating an example of a screen that is displayed by the terminal apparatus to present a list of files stored in the external service system;

FIGS. 26A and 26B are diagrams illustrating an example of a plurality of forms and an output file;

FIGS. 27A and 27B are diagrams illustrating a process or operation in which a data output system creates a file based on data acquired from a form in another embodiment; and FIG. 28 is a diagram describing association between an icon and region information. The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Figure 2:
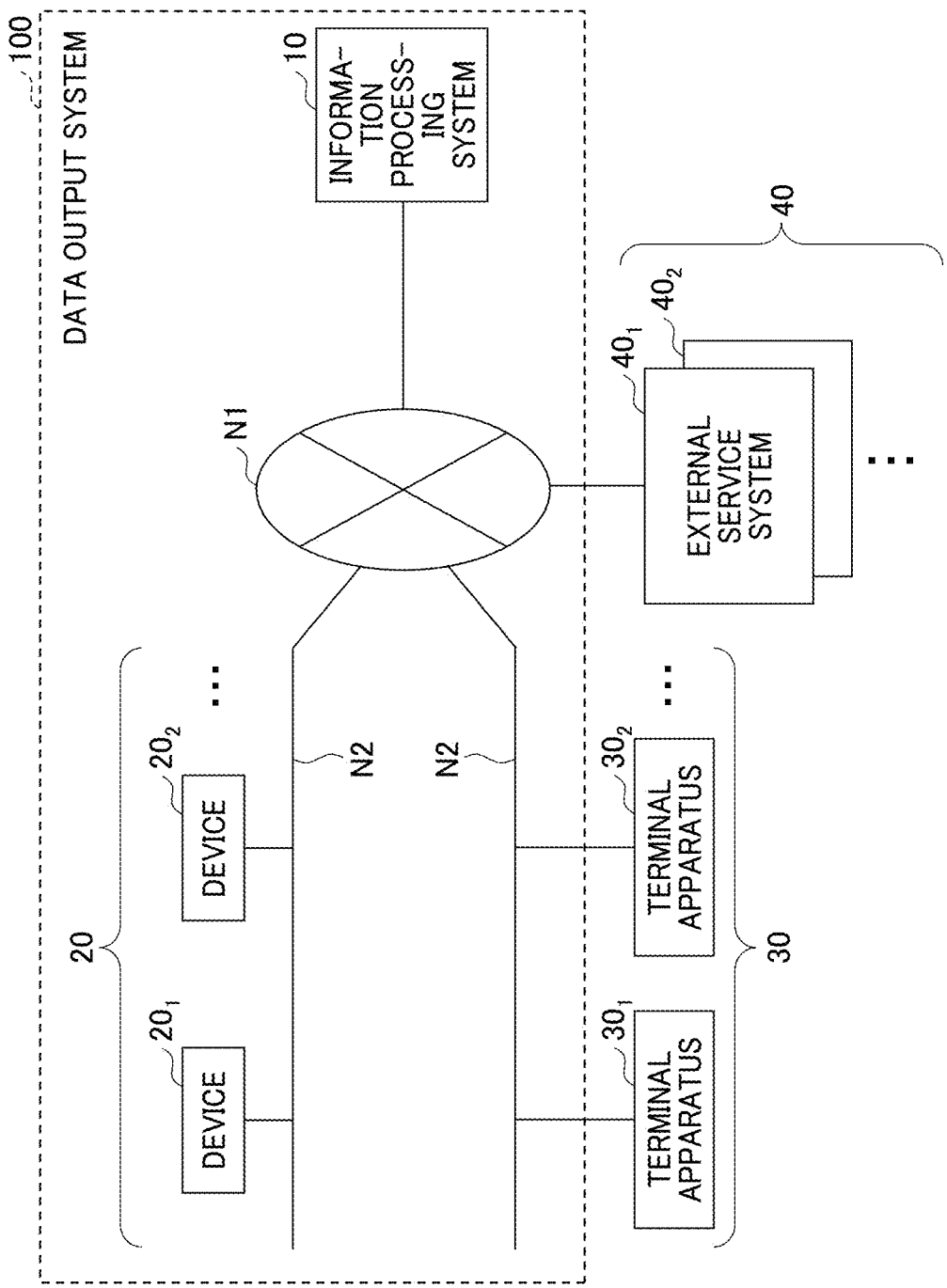
FIG. 2 is a diagram illustrating an example of a system configuration of the data output system according to an embodiment.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A data output system and a data output method carried out by the data output system will be described below as an example of an embodiment of the present disclosure.

<Overview of Operation or Process>

At organizations such as companies or parties, processing of forms such as expense report forms, invoice forms, or order forms often occurs. A person in charge at an organization daily performs work of extracting the dates, the case numbers, the subtotals, or the like from forms or of totaling the numbers. The processed forms are filed and then stored. However, a space for storing the forms incurs cost. Digitization of forms is gradually progressing. However, digitization also incurs troublesome work such as a person in charge modifying the file names automatically assigned to files of the forms.

There a system or service that automates billing processing or order taking and order placing. However, since such a system or service is costly, not many medium and small businesses can afford the system or service. For this reason, there is no alternative but to manually process forms.

In the present embodiment, based on region information registered in advance using a form having a marked region, an information processing system is capable of acquiring data from the region of forms created each day and outputting the data as an electronic file.

An overview of a process or operation performed by the data output system will be described with reference to FIGS. 1A and 1B. FIGS. 1A and 1B are diagrams describing a process or operation in which a data output system 100 (see FIG. 2) creates a file based on data acquired from a form. FIG. 1A is a diagram describing setting of region information for a form. FIG. 1B is a diagram describing acquisition of data from a form by using the region information.

(1) The data output system 100 is capable of cooperating with an external service system 40. The data output system 100 cooperates with the external service system 40 via an app. An app that runs on the data output system 100 may be simply referred to as "app", and an app that runs on the external service system 40 may be referred to as "cooperating app". In such a case, the data output system 100 associates app IDs of the app and the cooperating app with each other and stores the association.

(2) An administrator 8 of the data output system 100 uses a form 7 used daily by users at an organization to designate a region of the form 7 from which data is to be acquired. For example, a region of the form 7 may be filled with a marker or surrounded by a line drawn with a marker. A device 20 scans the form 7 having the marked region, generates image data, and transmits the image data to an information processing system 10. The form 7 having a marking may have fields filled in with characters or the like, may just have blank fields, or may be blank.

(3) The information processing system 10 stores, in a setting file, region information of the region designated with the marker. The region information is, for example, coordinates of opposite vertices of a quadrangular region in the image data. The information processing system 10 stores the setting file in the external service system 40.

(4)-1 The administrator 8 causes a terminal apparatus 30 to access the external service system 40, downloads the setting file, and complements the setting file in terms of a language of the form 7 and a date format.

(4)-2 The administrator 8 also causes the terminal apparatus 30 to access the information processing system 10 and performs an operation of associating the app ID of the app and the setting file with each other. The administrator 8 can associate any number of app IDs with the setting file. Consequently, an icon for accepting selection of the corresponding app and the region information subjected to image processing are associated with each other.

(5) When a user 6 at the organization submits the form 7 to the organization to be paid for the expenses, the user 6 presses an icon for the app corresponding to this form 7 on the device 20. An app is easily selected based on a plurality of form names. The user 6 causes the device 20 to scan the form 7 having information is handwritten in required fields or the printed form 7. The device 20 scans the form 7, generates image data (for example, a PDF file), and transmits the app ID of the app and the image data to the information processing system 10.

(6) The information processing system 10 uses the app ID to identify the setting file, and acquires (for example, clips), from the image data, a region indicated by the region information included in the setting file acquired from the external service system 40. Thus, the region of the form 7 registered by the administrator 8 is acquired.

(7) The information processing system 10 performs OCR processing on this region alone to obtain data. That is, data (character codes of characters, etc.) in the region is acquired.

(8) The information processing system 10 outputs the data to an electronic file (for example, a comma separated value (CSV) file), and transmits the file and the image data to the external service system 40. If the information processing system 10 designates the app ID of the cooperating app, the information processing system 10 can transmit the file and the image data to the designated cooperating app.

(9) The external service system 40 registers the image data and the file to a folder (or a directory) designated by the administrator 8. Since the file includes information used for payment, a person in charge can perform payment processing.

As described above, the data output system 100 according to the present embodiment scans, with the device 20, a form having a marked region and stores region information for each form. The information processing system 10 acquires a region from the image data of the form transmitted from the device 20, performs OCR processing on the region, and outputs data of the OCR processing result to a file. This enables a region subjected to image processing to be associated with each of any number of icons. Thus, the user simply selects an icon in accordance with, for example, the kind of the form to be able to cause image processing (for example, OCR processing) to be performed on a desired region in the image data generated by scanning.

Terminology

The term "administrator" refers to a system administrator or the like, at a client of the data output system 100, who makes settings of the data output system 100 for general users. The term "user" refers to a general user at the client. Since the general user may perform the work of the administrator, the terms "administrator" and "user" may be used interchangeably.

The term "OCR" refers to a technique of converting shapes of handwritten or printed characters into electric signals with photosensitive elements to convert the characters into digital character codes usable by a computer. OCR may also be referred to as character recognition processing, character conversion processing, digitization, or the like. Data obtained by OCR processing is data of various types such as Japanese, English, numerals, symbols, and drawings.

The term "form" is a generic term for an account book, a slip, or the like. The form may also referred to as an office paper with blank fields to be filled in by a user. Description will be given mainly for the form in the present embodiment. As long as documentation is scannable by the device 20, the documentation may have any name. For example, a document, a paperwork, a letter, a report, a newspaper, a magazine, or the like may be the target. There may be a case where the form is not printed on a paper medium (the device 20 need not scan the form).

The image data subjected to OCR processing may be of any type. Examples of the image data include image data according to PDF, Joint Photographic Experts Group (JPEG), Portable Network Graphics (PNG), Tagged Image File Format (TIFF), Microsoft Windows Bitmap Image (BMP), or the like.

Information regarding a region (OCR region) subjected to OCR processing is information used by the information processing system 10 to identify the OCR region. In the present embodiment, the information regarding an OCR region is described by the term "region information".

In the present embodiment, the term "setting file" refers to a file in which region information is set. The term "file" refers to a file to which data is output. A file is a set of data serving as a basic unit of data managed by a computer.

The expression "outputting data" refers to allowing a user to visually check the data. In the present embodiment, for example, the data is output to a file.

Identification information may be any information for identifying a region. The identification information need not be an image, and it is sufficient that any kind of identification information is associated with the region in advance. In the present embodiment, the identification information is described by the term "app ID". The identification information may be an app name, a setting name, a setting number, a form name, a document name, or a Uniform Resource Locator (URL) embedded in a link as well as an app ID, an icon, or a button as long as the identification information is information for identifying a region.

The term "image processing result" refers to a product obtained by image processing. For example, the term "image processing result" refers to character codes (data) which is an OCR processing result.

A selection accepting component is a display component that allows the device 20 or the terminal apparatus 30 to accept selection performed by a user. The selection accepting component may be displayed by the device 20 or by the terminal apparatus 30. The selection accepting component is called, for example, an icon or a button but may be called in any manner. The selection accepting component is displayed on, for example, a display equipped with a touch panel. However, in the case where the display is not equipped with a touch panel, a cursor is moved to the selection accepting component with a keyboard or mouse, and the selection accepting component is clicked on with the keyboard or mouse, so that the selection accepting component accepts the selection.

Information regarding the selection accepting component is, for example, information for identifying or specifying the selection accepting component. In the present embodiment, the information regarding the selection accepting component is described by the term "app ID" of an app.

An icon is a figure (image) to which an instruction or command to be given to a computer, a document file, or the like is symbolized for easy understanding. A button is a figure (image) that is clicked on with a mouse or pressed with a finger by a user and that gives a command to software. For each of the icon and the button, operation content or command content may be written. The icon and the button need not be strictly distinguished between.

<Example of System Configuration>

A system configuration of the data output system 100 according to the present embodiment will be described first with reference to FIG. 2. FIG. 2 is a diagram illustrating an example of a system configuration of the data output system 100 according to the present embodiment.

The data output system 100 illustrated in FIG. 2 includes the information processing system 10 and the devices 20. The information processing system 10 and the devices 20 are communicably connected to each other via a network N1, which is a wide area network, such as Internet. The data output system 100 communicates with the external service systems 40 which are external systems. Terminal apparatuses 30 of any kinds can communicate with the information processing system 10 via the network N1 and a network N2.

The information processing system 10 is implemented by one or more information processing apparatuses. The information processing system 10 provides various services such as cloud services via the network N1. The various services are implemented by a series of processes performed in cooperation with the external service systems 40. Specific examples of the services provided by the information processing system 10 according to the present embodiment will be described later. The information processing system 10 may be implemented by cloud computing or by a single information processing apparatus. The term "cloud computing" refers to internet-based computing where resources on a network are used or accessed without identifying specific hardware resources. The information processing system 10 may be on the Internet or may be on-premise. The series of processes is provided by a single app, and may also be referred to as a "processing flow" or "work flow".

The devices 20 are various electronic devices used by users. The devices 20 are, for example, an image processing apparatus such as an MFP, an image forming apparatus, a personal computer (PC), a projector, an electronic whiteboard, and a digital camera. The devices 20 are connected to the network N2. Users use the devices 20 to able to use various services provided by at least one of the information processing system 10 or the external service systems 40.

Hereinafter, when the plurality of devices 20 are distinguished from one another, subscripts are used to refer to the individual devices 20 such as "device 20i", "device 202", etc.

The terminal apparatuses 30 are, for example, a desktop PC, a notebook PC, a smartphone, and a tablet terminal used by an administrator or a user. In addition to the aforementioned apparatuses, the terminal apparatuses 30 may be any apparatuses on which a web browser is operable. The terminal apparatuses 30 are connected to the network N2. The administrator or the users operate the terminal apparatuses 30 to be able to use various services provided by the information processing system 10 or the external service systems 40 and to make settings of the cooperating app or the app.

The devices 20 and the terminal apparatuses 30 are described in a distinguished manner for convenience of description. However, the devices 20 and the terminal apparatuses 30 may be collectively referred to as devices.

Hereinafter, when the plurality of terminal apparatus 30 are distinguished from one another, subscripts are used to refer to the individual terminal apparatuses 30 such as "terminal apparatus 30i", "terminal apparatus 302", etc.

The external service systems 40 are implemented by one or more information processing apparatuses that execute the cooperating app to provide services via the network N1. The cooperating app is executed to manage or process data, and the date or the processing result is the service.

Examples of the external service systems 40 include, for example, a cloud service, an application service provider (ASP), etc. The external service systems 40 may include various external services provided via a network. In the present embodiment, a storage service will be described as an example of the service. The external service systems 40 may be on the Internet or may be on-premise.

Hereinafter, when the plurality of external service systems 40 are distinguished from one another, an "external service system 401" illustrated in FIG. 2 is referred to as "external service system 40A", an "external service system 402" illustrated in FIG. 2 is referred to as "external service system 40B", etc.

<Example of Hardware Configurations>

Hardware configurations of the information processing system 10 and the terminal apparatus 30 included in the data output system 100 according to the present embodiment will be described with reference to FIG. 3.

<<Information Processing System and Terminal Apparatus>>

Figure 3:
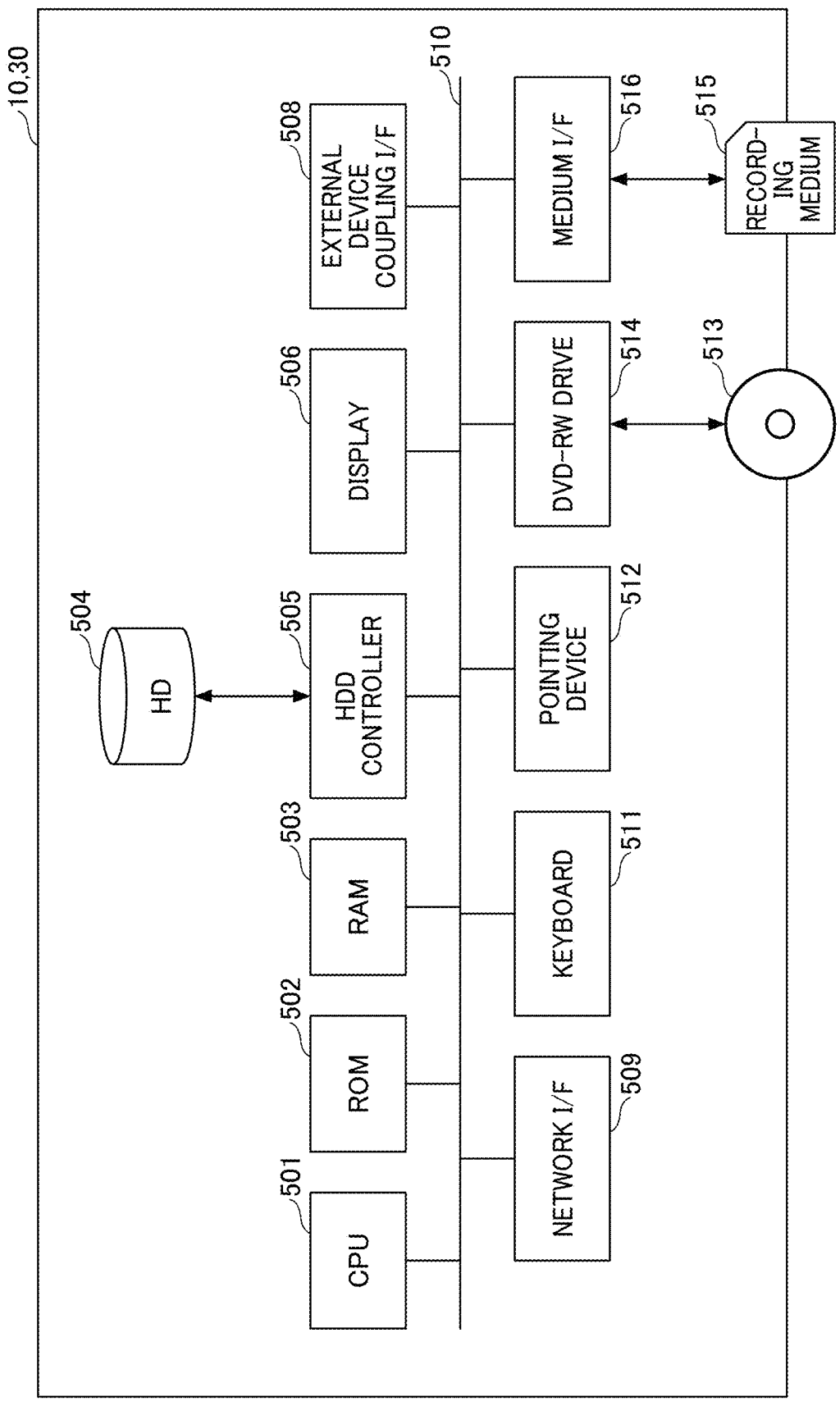
FIG. 3 is a diagram illustrating an example of a hardware configuration of an information processing system and a terminal apparatus.

FIG. 3 is a diagram illustrating an example of hardware configurations of the information processing system 10 and the terminal apparatuses 30 according to the present embodiment. As illustrated in FIG. 3, each of the information processing system 10 and the terminal apparatus 30 is implemented by a computer. Each of the information processing system 10 and the terminal apparatus 30 includes a central processing unit (CPU) 501, a read-only memory (ROM) 502, a random access memory (RAM) 503, a hard disk (HD) 504, a hard disk drive (HDD) controller 505, a display 506, an external device coupling interface (I/F) 508, a network I/F 509, a bus line 510, a keyboard 511, a pointing device 512, a digital versatile disc rewritable (DVD-RW) drive 514, and a medium I/F 516.

The CPU 501 controls operation of the entire information processing system 10 or the entire terminal apparatus 30. The ROM 502 stores a program such as an initial program loader (IPL) used for driving the CPU 501. The RAM 503 is used as a work area for the CPU 501. The HD 504 stores various kinds of data such as a program. The HDD controller 505 controls reading or writing of various kinds of data from or to the HD 504 under control of the CPU 501. The display 506 displays various kinds of information such as a cursor, a menu, a window, characters, or an image. The external device coupling I/F 508 is an interface that couples various external devices to the information processing system 10 or the terminal apparatus 30. The external devices in this case are, for example, a Universal Serial Bus (USB) memory and a printer. The network I/F 509 is an interface for performing data communication via the network N1 or N2. The bus line 510 is a bus such as an address bus or a data bus that electrically couples the components such as the CPU 501 illustrated in FIG. 3 to one another.

The keyboard 511 is an example of an input device having a plurality of buttons with which a user inputs characters, numerals, or various instructions. The pointing device 512 is an example of an input device with which a user selects or executes various instructions, selects a target for processing, or moves a cursor. The DVD-RW drive 514 controls reading or writing of various kinds of data from or to a DVD-RW 513, which is an example of a removable recording medium. The removable storage medium is not limited to the DVD-RW and may be a digital versatile disc-recordable (DVD-R) or the like. The medium I/F 516 controls reading or writing (storing) of data from or to a recording medium 515 such as a flash memory.

<<Device>>

Figure 4:
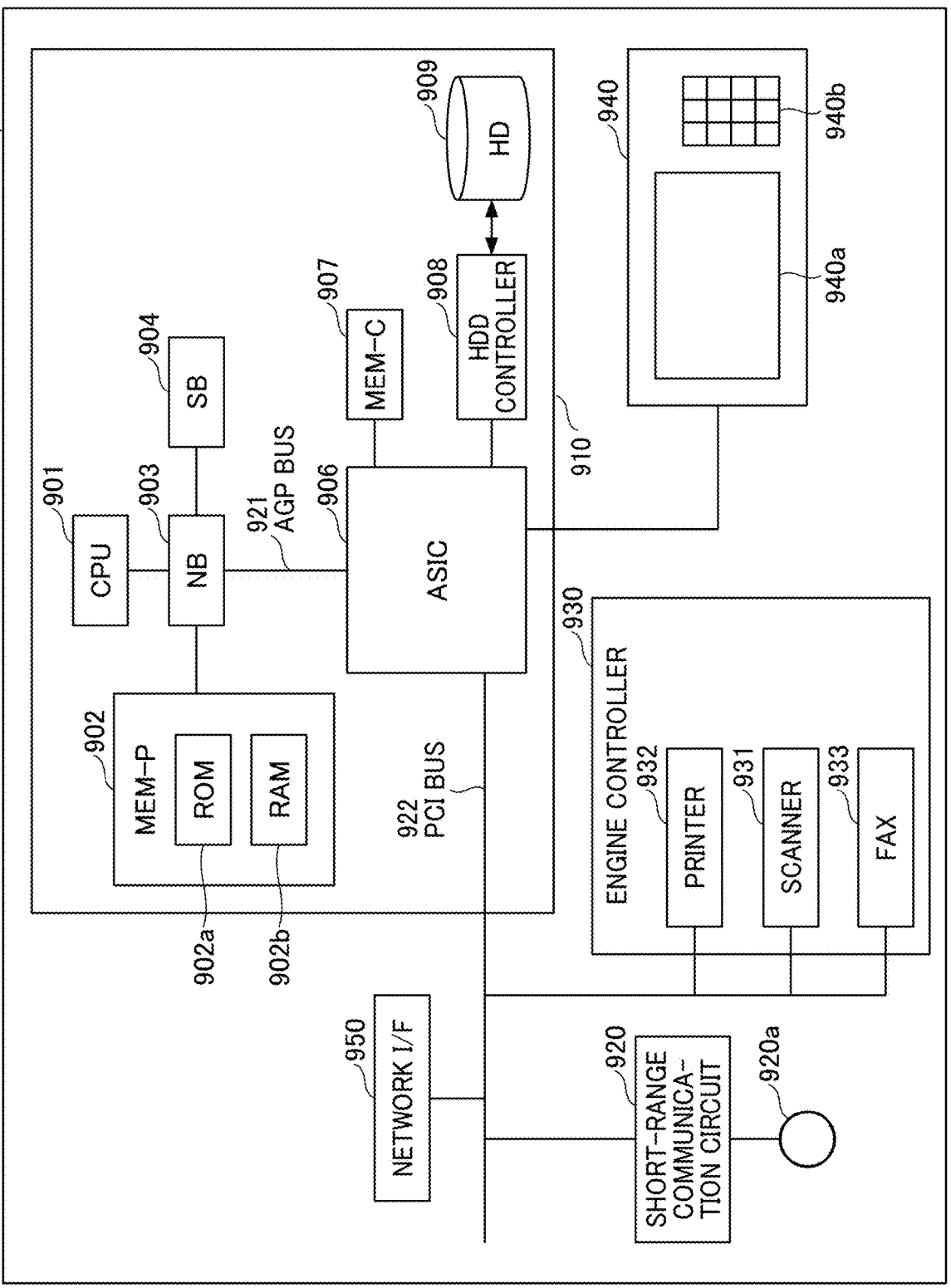
FIG. 4 is a diagram illustrating an example of a hardware configuration of an image forming apparatus.

FIG. 4 is a diagram illustrating an example of a hardware configuration of an image forming apparatus, which is an example of the device 20. As illustrated in FIG. 4, the image forming apparatus includes a controller 910, a short-range communication circuit 920, an engine controller 930, an operation panel 940, and a network I/F 950.

The controller 910 includes, as major components of a computer, a CPU 901, a system memory (MEM-P) 902, a northbridge (NB) 903, a southbridge (SB) 904, an application-specific integrated circuit (ASIC) 906, a local memory (MEM-C) 907 serving as a storage, an HDD controller 908, and an HD 909 serving as a storage. The NB 903 and the ASIC 906 are coupled to each other by an Accelerated Graphics Port (AGP) bus 921.

The CPU 901 is a controller that controls entire operation of the image forming apparatus. The NB 903 couples the CPU 901 to the MEM-P 902, the SB 904, and the AGP bus 921. The NB 903 includes a Peripheral Component Interconnect (PCI) master, an AGP target, and a memory controller that controls reading or writing of data from or to the MEM-P 902.

The MEM-P 902 includes a ROM 902a as a memory that stores a program and data for implementing various functions of the controller 910. The MEM-P 902 further includes a RAM 902b as a memory to which the program and data are loaded or as a rendering memory that stores data rendered for printing. The program stored in the RAM 902b may be stored in any computer-readable recording medium, such as a compact disc-read only memory (CD-ROM), compact disc-recordable (CD-R), or digital versatile disc (DVD), as a file in an installable or executable format, for distribution.

The SB 904 couples the NB 903 to a PCI device and a peripheral device. The ASIC 906 is an image-processing-application-specific integrated circuit (IC) including hardware components for image processing. The ASIC 906 has a role of a bridge that couples the AGP bus 921, a PCI bus 922, the MEM-C 907, and the HDD controller 908 to one another. The ASIC 906 includes a PCI target, an AGP master, an arbiter (ARB) as a central processor of the ASIC 906, a memory controller, a plurality of direct memory access controllers (DMACs), and a PCI unit. The memory controller controls the MEM-C 907. The DMACs perform rotation on image data with a hardware logic or the like. The PCI unit transfers data between a scanner 931, a printer 932, and a fax 933 through the PCI bus 922. The ASIC 906 may be coupled to a USB interface or an Institute of Electrical and Electronics Engineers 1394 (IEEE1394) interface.

The MEM-C 907 is a local memory used as a buffer for image data to be copied or as a code buffer. The HD 909 is a storage that stores image data, font data for use in printing, and form data. The HDD controller 908 controls reading or writing of data from or to the HD 909 under control of the CPU 901. The AGP bus 921 is a bus interface for a graphics accelerator card, which has been proposed to accelerate graphics processing. The AGP bus 921 enables direct access to the MEM-P 902 at a high throughput to increase the speed of the graphics accelerator card.

The short-range communication circuit 920 is equipped with a short-range communication antenna 920a. The short-range communication circuit 920 is a communication circuit that is compliant with Near Field Communication (NFC), Bluetooth (registered trademark), or the like.

The engine controller 930 includes the scanner 931, the printer 932, and the fax 933. The operation panel 940 includes a panel display 940a such as a touch panel, and a hardware keypad 940b. The panel display 940a displays a screen of current setting values, a selection screen, and so on and accepts input from an operator. The hardware keypad 940b includes, for example, numeral buttons that accept setting values of image forming conditions such as color density setting conditions and a start button that accepts a copy start instruction or the like. The controller 910 controls the entire image forming apparatus. For example, the controller 910 controls rendering, communication, and inputs from the operation panel 940. The scanner 931 or the printer 932 includes a component for image processing such as error diffusion and gamma conversion.

With an application switching button of the operation panel 940, the user can sequentially switch between a document box function, a copy function, a printer function, and a fax function of the image forming apparatus to select one of the functions. When the document box function is selected, the image forming apparatus enters a document box mode. When the copy function is selected, the image forming apparatus enters a copy mode. When the printer function is selected, the image forming apparatus enters a printer mode. When the fax function is selected, the image forming apparatus enters a fax mode.

The network I/F 950 is an interface for performing data communication via the network N2. The short-range communication circuit 920 and the network I/F 950 are electrically coupled to the ASIC 906 through the PCI bus 922.

<Functions>

Figure 5:
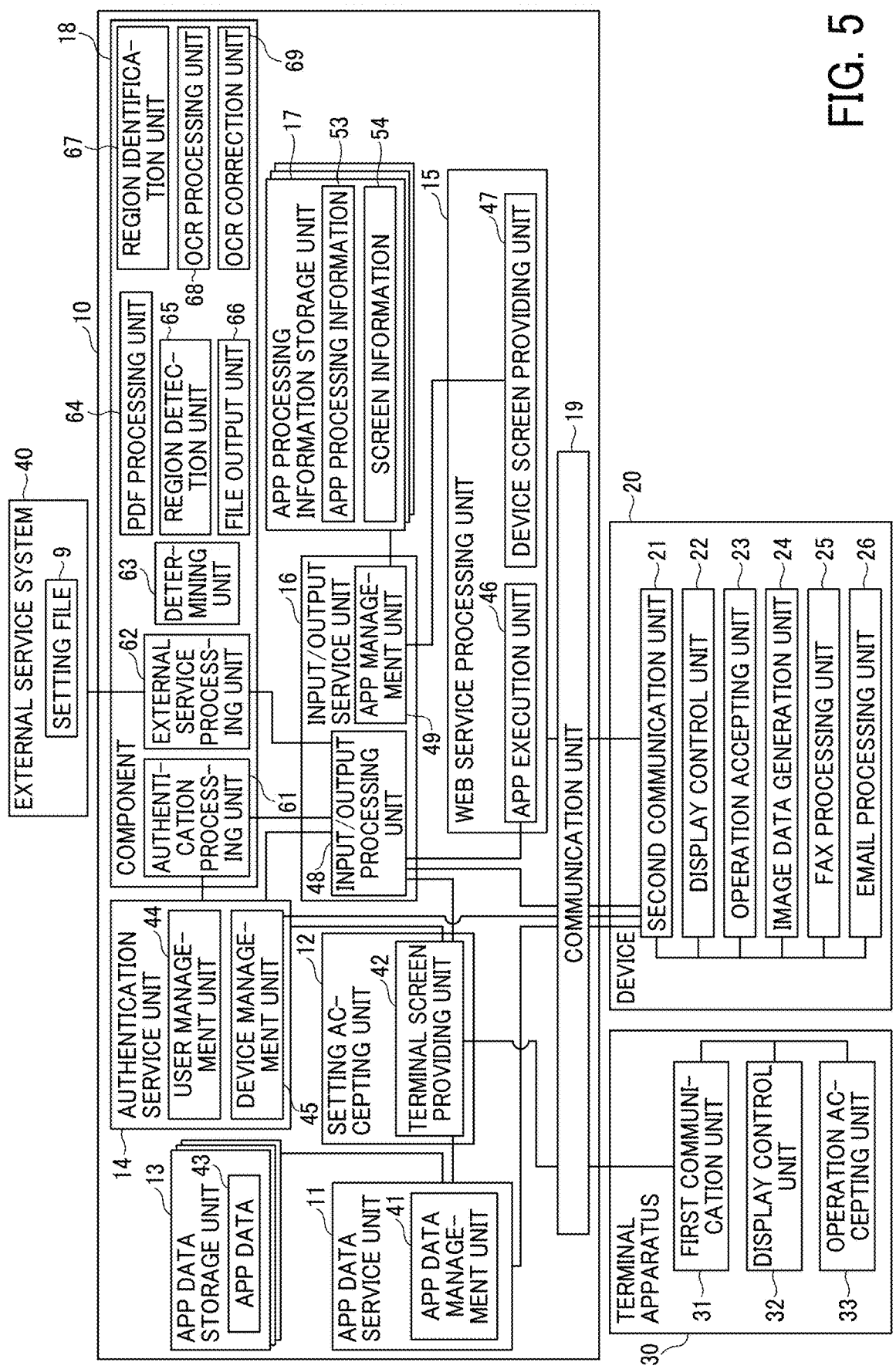
FIG. 5 is a diagram illustrating an example of functional configurations of the device, the terminal apparatus, and the information processing system.

A functional configuration of the data output system 100 according to the present embodiment will be described next with reference to FIG. 5. FIG. 5 is a diagram illustrating an example of functional configurations of the device 20, the terminal apparatus 30, and the information processing system 10 according to the present embodiment.

<<Device>>

The device 20 includes a second communication unit 21, a display control unit 22, an operation accepting unit 23, an image data generation unit 24, a fax processing unit 25, and an email processing unit 26. These functional units are functions or units that are implemented by the CPU 901 executing commands included in one or more programs installed to the device 20. For example, the second communication unit 21, the display control unit 22, and the operation accepting unit 23 are implemented by a web browser. The rest are implemented by individual applications (native apps).

The second communication unit 21 transmits and receives various kinds of information to and from the information processing system 10. In the present embodiment, the second communication unit 21 receives screen information such as app list screen information from the information processing system 10. The second communication unit 21 transmits information such as image data of a form and an app ID to the information processing system 10.

The display control unit 22 interprets screen information of various screens to display the screens on the panel display 940a. The operation accepting unit 23 accepts various user operations performed in the various screens displayed on the panel display 940a.

If the app, selection of which is accepted by the operation accepting unit 23, is an app for generating image data, the image data generation unit 24 generates image data of an original scanned with the scanner 931. The image data generation unit 24 has a scan function. The image data generation unit 24 converts the image data into a PDF file. The image data (such as JPEG, TIFF, or PNG) may be used without being converted. The fax processing unit 25 performs processing relating to reception and transmission of a fax performed by the fax 933. In response to reception of a fax, the fax processing unit 25 requests the information processing system 10 to execute an app associated in advance. The fax processing unit 25 may request an app corresponding to a sender (fax number) of the fax.

The email processing unit 26 performs processing relating to transmission and reception of an email. In response to reception of an email, the email processing unit 26 requests the information processing system 10 to execute an app associated in advance. The email processing unit 26 may request an app corresponding to a sender (email address) of the email.

<<Terminal Apparatus>>

The terminal apparatus 30 includes a first communication unit 31, a display control unit 32, and an operation accepting unit 33. These functional units are functions or units that are implemented by the CPU 501 executing commands included in one or more programs installed to the terminal apparatus 30. The programs may be a web browser or dedicated software for communicating with the information processing system 10.

The first communication unit 31 transmits and receives various kinds of information to and from the information processing system 10 or the external service systems 40. The first communication unit 31 is an example of a second communication unit. In the present embodiment, the first communication unit 31 receives information such as various kinds of screen information from the information processing system 10 or the external service systems 40. The first communication unit 31 transmits information set by an administrator or a user to the information processing system 10 or the external service systems 40.

The display control unit 32 interprets screen information of various screens to display the screens on the display 506. The operation accepting unit 33 accepts various user operations performed in the various screens displayed on the display 506.

<<Information Processing System>>

The information processing system 10 includes an app data service unit 11, a setting accepting unit 12, an authentication service unit 14, a web service processing unit 15, an input/output service unit 16, a component 18, and a communication unit 19. These functional units are functions or units that are implemented by the CPU 501 executing commands included in one or more programs installed to the information processing system 10. For the convenience of illustration, a single information processing apparatus has the various functional units of the information processing system 10 in FIG. 5. However, the various functional units may be distributed to a plurality of information processing apparatuses.

The communication unit 19 transmits and receives various kinds of information to and from the terminal apparatus 30 and the device 20. The setting accepting unit 12 provides a setting site to the terminal apparatuses 30 and accepts settings for the setting site. The site may refer to a web page or a web app, or refer to a system on a server that provides a web page or a web app to the terminal apparatuses 30. The setting accepting unit 12 includes a terminal screen providing unit 42. The terminal screen providing unit 42 provides, for example, screen information of an initial screen, an app list screen, and an association screen that allow an administrator to set information used for executing an app. In response to an Hypertext Transfer Protocol (HTTP) request from the terminal apparatus 30, the terminal screen providing unit 42 generates screen information written in Hypertext Markup Language (HTML), Extensible Markup Language (XML), Cascade Style Sheet (CSS), Java Script (registered trademark), or the like, and transmits the screen information to the terminal apparatus 30 as an HTTP response.

The app data service unit 11 includes an app data management unit 41. The app data management unit 41 manages, for each client such as a company, app data 43 of an app purchased by the client. The app data 43 associates, for example, an app with the region information described above. The app data 43 is stored in an app data storage unit 13. An organization such as a client viewed from the data output system 100 is called a tenant.

The web service processing unit 15 provides screen information to the device 20 and accepts a request to execute an app from the device 20. The web service processing unit 15 includes an app execution unit 46 and a device screen providing unit 47. The app execution unit 46 accepts an app execution request from the device 20 and requests an input/output processing unit 48 to execute an app. The device screen providing unit 47 uses screen information 54 to provide screen information of an app list screen or an app screen to the device 20.

The input/output service unit 16 uses the authentication service unit 14, an app processing information storage unit 17, and the component 18 to input and output data. The input/output service unit 16 includes the input/output processing unit 48 and an app management unit 49. The input/output processing unit 48 executes an app requested by the app execution unit 46. In execution, with reference to app processing information 53, the input/output processing unit 48 requests the component 18 to perform each process included in the app. The app management unit 49 manages the app processing information 53 of each app and the screen information 54 stored in the app processing information storage unit 17. In the app processing information 53, the order of processes performed by the app (for example, after OCR, the app requests the external service system 40 to perform a process) is set. The screen information 54 is information of screens displayed by the devices 20, such as an icon of each app, the app list screen, and each app screen. The app processing information storage unit 17 stores, for each app, the app processing information 53 and the screen information 54.

The authentication service unit 14 performs processing relating to authentication of users (including an administrator) and the device 20. The authentication service unit 14 includes a user management unit 44 and a device management unit 45. The user management unit 44 manages information regarding users. For example, the user management unit 44 holds authentication information such as a user name and a password. The authentication information includes authentication information for the information processing system 10 and authentication information for the external service systems 40. The device management unit 45 manages the devices 20 associated with tenants. That is, the device management unit 45 manages identification information of a tenant and the device 20 in association with each other. Thus, once the device 20 is identified, the tenant is also identified.

The component 18 is a generic term of individual functions that actually perform respective processes. Each block in the component 18 corresponds to a single process. The component 18 includes, for example, an authentication processing unit 61, an external service processing unit 62, a determining unit 63, a PDF processing unit 64, a region detection unit 65, a file output unit 66, a region identification unit 67, an OCR processing unit 68, and an OCR correction unit 69. The OCR processing unit 68 is an example of a processing result output unit. The authentication processing unit 61 is the component 18 that requests the authentication service unit 14 to perform processing relating to authentication. The external service processing unit 62 is the component 18 that requests the external service system 40 to perform a process. That is, the external service processing unit 62 is a function for cooperating with the external service systems 40. The external service processing unit 62 is prepared for each of the external service systems 40. The determining unit 63 makes various determinations and controls branches in a processing flow. The PDF processing unit 64 performs processing relating to a PDF file. For example, the PDF processing unit 64 extracts image data from a PDF file or creates a transparent-text-attached PDF file. The PDF processing unit 64 is provided because the device 20 transmit image data in a PDF file format. The region detection unit 65 detects a quadrangular region marked with a marker or the like from image data, and creates information on coordinates (region information) of the quadrangular region. The file output unit 66 creates a setting file including region information. The file output unit 66 also outputs a file including an OCR processing result (data obtained from the region of a form). The region identification unit 67 identifies a region from image data on the basis of region information. The region identification unit 67 acquires (for example, may clip) the identified region. The OCR processing unit 68 performs OCR processing on the region alone or on the entire image data. The OCR correction unit 69 corrects the OCR processing result. In addition to the illustrated blocks, the component 18 may include a block for translation, for example.

TABLE 1

| App ID | App name | Screen information | App processing information | Shared app | External service system |
|---|---|---|---|---|---|
| app001 | OCR region designation (individual) | Screen definition information A1 | Processing flow information A1 | No | A |
| app002 | OCR region designation (shared) | Screen definition information A2 | Processing flow information A2 | Yes | B |
| app003 | Detailed statement | Screen definition information A3 | Processing flow information A3 | No | A |
| app004 | Expense report | Screen definition information A4 | Processing flow information A4 | Yes | B |
| app005 | Order | Screen definition information A3 | Processing flow information A3 | No | A |
| app006 | License | Screen definition information A3 | Processing flow information A3 | No | C |

Table 1 presents an example of the app processing information 53 held by the app processing information storage unit 17. The app processing information storage unit 17 stores, for each tenant, a list of purchased (licensed) apps. Information in Table 1 is a list of apps that perform image processing on part of received image data described in the present embodiment among apps included in the list stored in the app processing information storage unit 17, and has fields such as an app ID, an app name, screen information, app processing information, a shared app, and the external service system 40. The app ID is identification information for identifying an app. The app name is a name assigned to the app by an administrator. The screen information 54 (written in HTML or the like) used when the device 20 displays an icon of the app or a setting screen of the app is also associated with the app. Each app defines content of a series of processes and the order of the series of processes (processing flow). Thus, the app processing information 53 is associated with the app. As described later, an app created by reproduction has the same flow information. A general app is an app for which a use right is given to each user, whereas a shared app is an app used in common by users of a tenant. In Table 1, an expense report app is a shared app. This is because the expense report app is used in common by users. The field of the external service system 40 indicates the external service system 40 with which the app cooperates. There are apps that do not cooperate with the external service systems 40.

In response to login of an administrator or a user, the app management unit 49 acquires a list of apps for which the administrator or the user has the use right from the app processing information storage unit 17 and provides the list of apps to the device 20. In response to designation of an app from the list of apps, the app management unit 49 identifies the screen information 54 and the app processing information 53 that are associated with the app.

TABLE 2

(a) User information

| User ID | User name | Email address | Password | Usable apps | External service system information |
|---|---|---|---|---|---|
| U001 | Hanako Tokkyo | hanako@sample.com | **** | app001 app003 | A |
| U002 | Taro Tokkyo | taro@sample.com | **** | app001 app003 app004 | A B C |
| U003 | Ichiro Jitsuyo | ichiro@sample.com | **** | app003 app004 | B |

(b)

| User ID | External service system | User ID | Password |
|---|---|---|---|
| U001 | A | hanako | **** |
| U002 | A | taro1 | **** |
|  | B | taro2 | **** |
|  | C | taro3 | **** |
| U003 | B | ichiro | **** |

(c)

| Shared app | External service system | Authentication information |
|---|---|---|
| app003 | B | Authentication information of U001 |
| ... | | |

Table 2 presents an example of user information managed by the user management unit 44. Table 2(a) has, as the user information, fields of a user ID, a user name, an email address, and a password that are registered to the information processing system 10, usable apps, and external service system information. This user includes an administrator. The password and at least one of the user ID, the user name, or the email address are authentication information used by the user to log into the information processing system 10. The usable apps are apps for which the user has the use right. The administrator assigns each user an app for which the license is purchased for a specified number of users, so that the use right is given to each user. The usable apps include individual apps and shared apps. Both the individual app and the shared app are used by a plurality of users. However, each user uses their authentication information for an external service in the case of individual apps, whereas a plurality of users use authentication information of the administrator for the external service in the case of shared apps. In Table 2(a), an app having an app ID "app003" permitted in common for user IDs "U001" to "U003" is a shared app. The rest are individual apps. In the case of individual apps, authentication information for an external service system needs to be registered for each user. The external service system information indicates the external service system 40 for which a cooperation setting is already set by the user.

The state in which the cooperation setting is already set indicates that the user desires cooperation with the external service system 40 and it is confirmed that the user is permitted to log in by using the authentication information for the external service system 40. When the user inputs the authentication information for the external service system 40 at the setting site and is permitted to log in, the identification information for the external service system 40 is set in the external service system information in Table 2(a). The authentication information for the external service system 40 is also registered to Table 2(b).

Table 2(b) stores information of each user in relation to an external service system, and has fields of a user ID, the external service system 40, a user ID, and a password. The authentication information for the external service system 40 for which the cooperation setting is set by the user is registered to Table 2(b). The authentication information for the external service system 40 is authentication information used by the user to log into the external service system 40. The authentication information may be different for each external service system 40 like the user having the user ID "U002". Thus, the authentication information for the external service system 40 is associated for each user of the data output system 100. In accordance with the authentication information such as the user ID and the password for the information processing system 10 acquired from the device 20, the information processing system 10 identifies the authentication information for the cooperating external service system 40.

It is sufficient that the authentication information is authentication information for the external service system 40 or authentication information used in cooperation with the external service system 40. In addition to the user ID and the password, the authentication information may be a token or the like acquired from the external service system 40 when cooperation with the external service system 40 is set.

Table 2(c) stores authentication information for each shared app. The external service system 40 and the authentication information are associated with identification information of the shared app. Since the authentication information of the administrator is used as the authentication information for the shared app, the identification information of the administrator is registered.

TABLE 3

App data

| applicationId | Application Name | fileId | fileName | Upload destination folder |
|---|---|---|---|---|
| app003 | Expense report | 6dh948y2 | /My_Drive/ExpenseReportForm_SettingFile.csv | /My_Drive/ExpenseReportFormStorageLocation |
| app004 | Order | 3oirucn9q | /My_Drive/OrderForm_SettingFile.csv | /My_Drive/OrderFormStorageLocation |
| ... | ... | ... | ... | ... |

Table 3 presents an example of the app data 43 stored in the app data storage unit 13. The app data 43 associates an app with a setting file (region information). The association is performed by the administrator. The field "applicationId" indicates an app ID of a cooperation-requesting app. The field "applicationName" indicates a name of the app. The field "fileId" indicates identification information of a setting file created by the information processing system 10. The field "fileName" indicates a file name of the setting file created by the information processing system 10. The setting file is stored in the external service system 40. The folder storing the setting file and the file name of the setting file are set in the field "fileName". The file name may be, for example, a URL. The field "Upload destination folder" indicates the external service system 40 and a folder, in the external service system 40, in which the setting file is stored. The upload destination folder may be, for example, a URL. The upload destination folder may be set by the administrator.

indicates the data format of the region. Examples of the data format include the date (YYYY/MM/DD), the numeric value, or the like. Since the format of the data is indicated, the OCR processing unit 68 is able to perform OCR processing highly accurately. The field "Format" has a pull-down menu. The type of data is set for each region in this manner. The field "CSV column name" indicates the name assigned to the region. In the case of a form, the title of the quadrangular frame is input. The administrator may input any value. The CSV column name is output to a file along with the data. The field "CSV position (column)" designates the column of the file at which the information processing system 10 writes the data extracted from the region. The field "CSV position (start row)" designates the row of the file at which the information processing system 10 writes the data extracted from the region. The row number increases each time the form is scanned. Thus, the "start row" when no data is written in a file is set. For example, data acquired from the first form is set in the second row, and data obtained

TABLE 4

Setting file

| A ID | B Start X coordinate | C Start Y coordinate | D End X coordinate | E End Y coordinate | F Format | G CSV column name | H CSV position (column) | I CSV position (start row) | K OCR language | L Order used in file name |
|---|---|---|---|---|---|---|---|---|---|---|
| 1 | 47 | 39 | 87 | 46 | | Document name | | | Japanese | 1 |
| 2 | 127 | 78 | 185 | 90 | YYYY/MM/DD | Submission date | 3 | 2 | English | 2 |
| 3 | 126 | 171 | 151 | 178 | numeric | Subtotal | 4 | 2 | English | |

Table 4 presents an example of a setting file 9 stored in the external service system 40. The setting file 9 is a file including region information subjected to OCR processing. The setting file 9 is in a table format (CSV format, for example), the position of each cell is designated by a column number and a row number. Fields of columns A to L will be described below. The field names in the first row of the setting file are set by the information processing system 10 when the setting file is created. The field "ID" indicates identification information of region information. Since the ID is automatically assigned, the administrator or user need not be conscious of the ID. The fields "Start X coordinate", "Start Y coordinate", "End X coordinate", and "End Y coordinate" are region information. These fields indicate opposite vertices of a marked quadrangular region in a form. Coordinates of a single point and a width and a height may be designated. Units of the coordinates may be, for example, cm or pixels.

The above information is information automatically set by the information processing system 10. The following information is input by the administrator. The field "Format"

from the second form is set in the third row. On the other hand, the column position may be fixed. In the field "OCR language", the language used in the region is set. Since the language is indicated, the OCR processing unit 68 is able to perform OCR processing highly accurately. The field "OCR language" has a pull-down menu. The type of data is set for each region in this manner. The field "Order used in file name" is used for the file name of the file to which data obtained from the region is output in the present embodiment. The order used in the file name is an order of data used in the file name of the file output by the information processing system 10. For example, in the case where the "document name" is the first and the "submission date" is the second, the file name is "ExpenseReportForm_20201010.csv" in accordance with the pieces of data (ExpenseReportForm and 20201010) acquired from the respective regions.

<App Processing Information>

Details of the app processing information 53 will be described next with reference to FIG. 6. FIG. 6 is a diagram illustrating an example of the app processing information 53 stored in the app processing information storage unit 17.

The app processing information 53 illustrated in FIG. 6 is information relating to a series of processes for implementing a service for requesting the "external service system B" to process image data generated by the device 20 by scanning.

The app processing information 53 includes a flow ID 1201A indicating identification information of the app processing information 53, a flow name 1202A indicating the name of the app processing information 53, and flow details 1203A indicating processing content of the series of processes. The flow name 1202A also indicates the name of the app.

The flow details 1203A include processing content 1223A indicating requesting the "external service system B" to perform processing.

In the processing content 1223A, a component ID "ExService_B" of the component 18 that performs a process in cooperation with the "external service system B" and parameters "AppId" and "Folder" are designated. The component ID "ExService_B" is equivalent to the external service processing unit 62 for the external service system B. The cooperating app ID (correspondence between an app and a cooperating app is determined in advance) is stored as the parameter "AppId". A folder in which a file is stored (upload destination folder) is stored as the parameter "Folder" (the upload destination folder set by the administrator is set). Thus, the information processing system 10 can store the image data generated by scanning in the "external service system B".

In the case of an app that does not cooperate with any cooperating app, the parameter "AppId" is omitted. The illustrated parameters are merely part of parameters, and more parameters may be included in the app processing information 53.

For ease of explanation, a single component is designated in FIG. 6. However, as many pieces of processing content 1223A of the series of processes performed by the app as the number of processes (components) are registered to the app processing information 53.

Figure 7A:
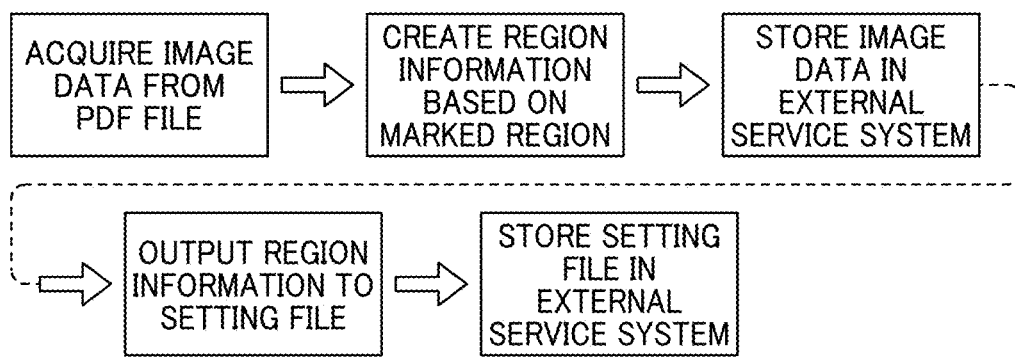
FIGS. 7A and 7B are diagrams schematically illustrating a series of processes performed by apps.
Figure 7B:
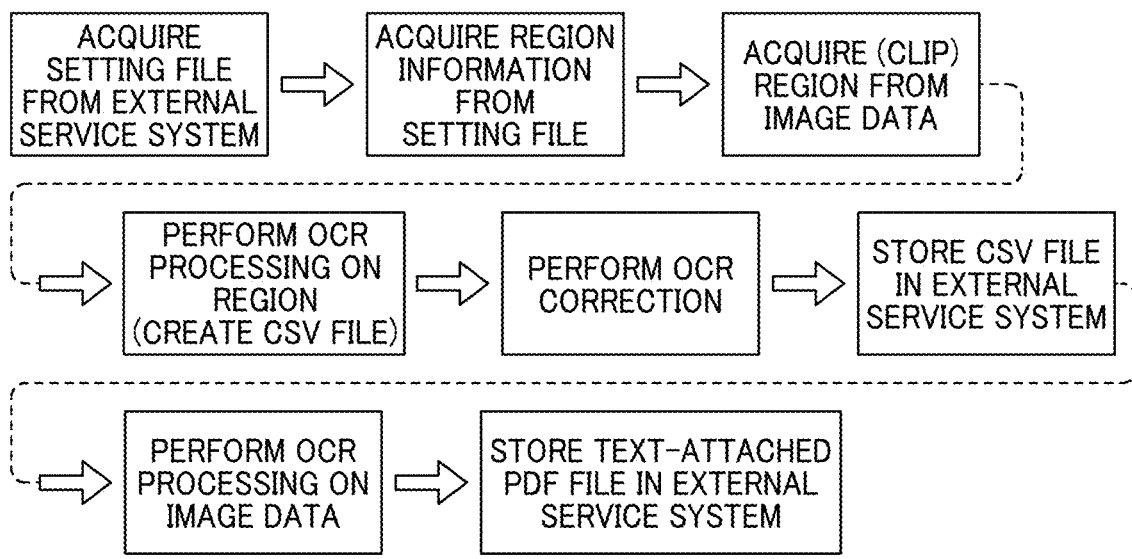

FIGS. 7A and 7B are diagrams schematically illustrating a series of processes performed by apps. FIG. 7A illustrates a series of processes performed by an app (for example, an OCR region designation app) that creates a setting file. Each block corresponds to the processing content 1223A. Details of each process will be described with reference to FIG. 10.

FIG. 7B illustrates a series of processes performed by an app (for example, an expense report app) that outputs data from regions of a form. Each block corresponds to the processing content 1223A. Details of each process will be described with reference to FIG. 22.

<Designation of Region, Acquisition of Region, and Creation of Setting File>

Designation of a region by the administrator, acquisition of a region, and creation of a setting file will be described next with reference to FIGS. 8A to 11C.

Figure 8A:
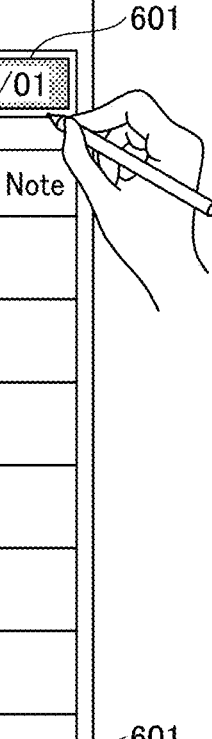

FIGS. 8A and 8B are diagrams describing a method of marking a region in a form. In FIG. 8A, colored portions 601 that are colored with a marker of a color (with saturation) other than white or black are formed. The color of the colored portions 601 corresponds to predetermined information. That is, the color of the marker is predetermined.

The region detection unit 65 detects pixels of a color other than black and white, and detects a circumscribed quadrangle of pixels of the color other than black and white (the colored portion 601). The marker of a color other than black and white is used to make it easier for the region detection unit 65 to detect the region. Thus, a black marker may be used. In this case, the region detection unit 65 detects a circumscribed quadrangle of black pixels having a height and an area of certain height and area or greater.

In FIG. 8B, frames 602 surrounding regions are formed with a marker of a color other than black and white. The region detection unit 65 detects pixels of the color other than black and white, and detects a circumscribed quadrangle of pixels of the color other than black and white (the frame 602).

The method of marking a region is not limited to the methods illustrated in FIGS. 8A and 8B. For example, a region may be designated with a double line or with a range surrounded by a predetermined symbol (such as %, $, #, or Δ).

In addition to the information of a color of a marker, the aforementioned predetermined information may be any information such as information of a figure such as a circle or quadrangle drawn with a black pen that is not a marker as long as the information indicates the OCR region. In this case, the user draws a circle or quadrangle with a black pen to surround an OCR region. The OCR region may be a region filled with a marker as well as a region surrounded by a line of the color of the marker.

Figure 9:
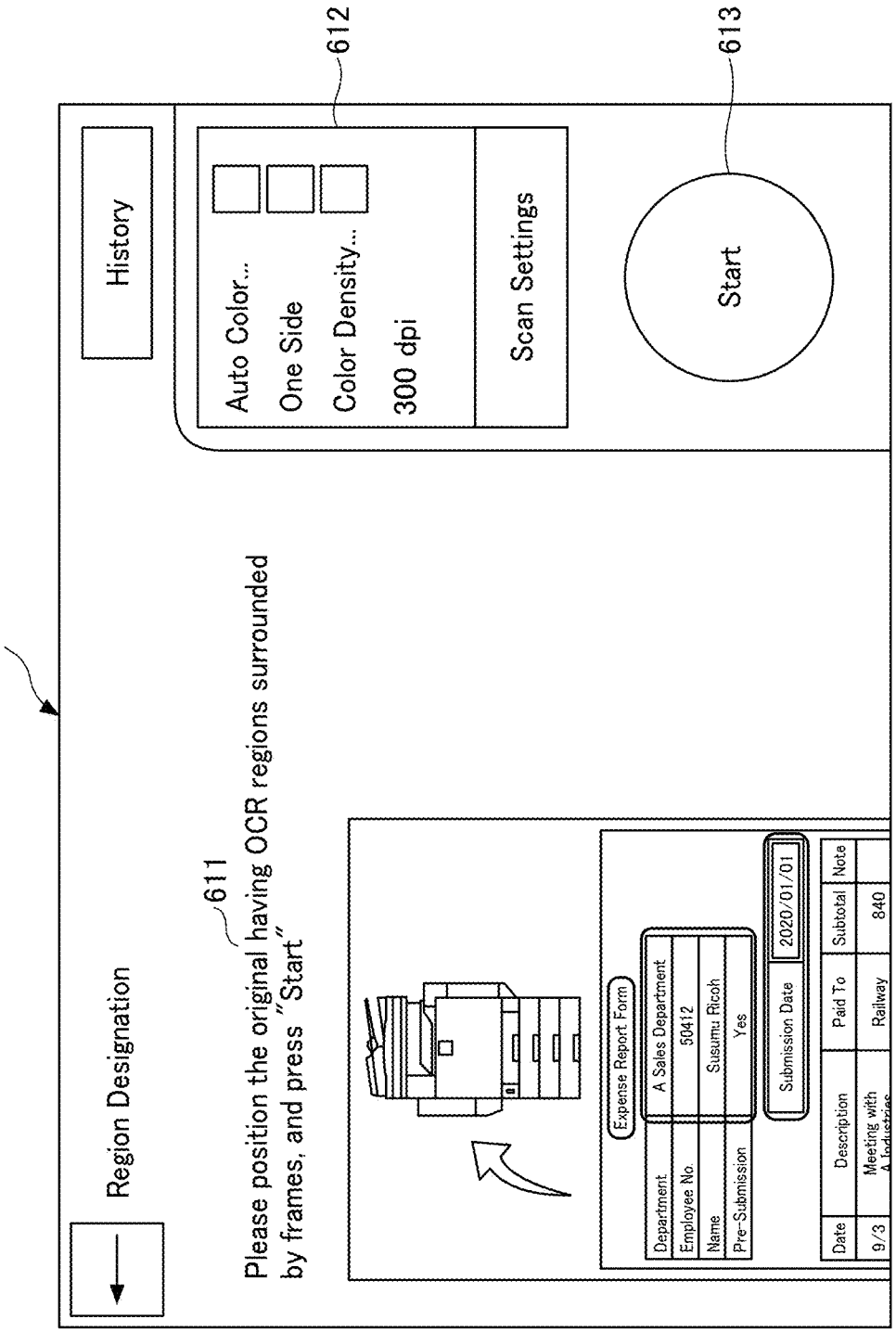
FIG. 9 is a diagram illustrating an example of a region registration screen displayed by the device when region information is registered.

FIG. 9 is an example of a region registration screen 610 displayed by the device 20 when region information is registered. The administrator logs into the information processing system 10 from the device 20 and selects the OCR region designation app. The region registration screen 610 includes a message 611 "Please position the original having OCR regions surrounded by frames, and press "Start"", a scan setting field 612, and a start button 613. The user positions the original (form) onto a contact glass, and presses the start button 613. The user may set scan conditions (such as color or black and white, one-side or double-side, orientation, and resolution) in the scan setting field 612 depending on circumstances. The color/black and white setting may be fixed to color so that the user does not mistakenly set the setting to black and white.

The administrator may designate a file name of the setting file in the region registration screen 610 illustrated in FIG. 9, so that the setting file is easily retrieved from the external service system 40. The user may set a folder in which the setting file is stored.

Figure 10:
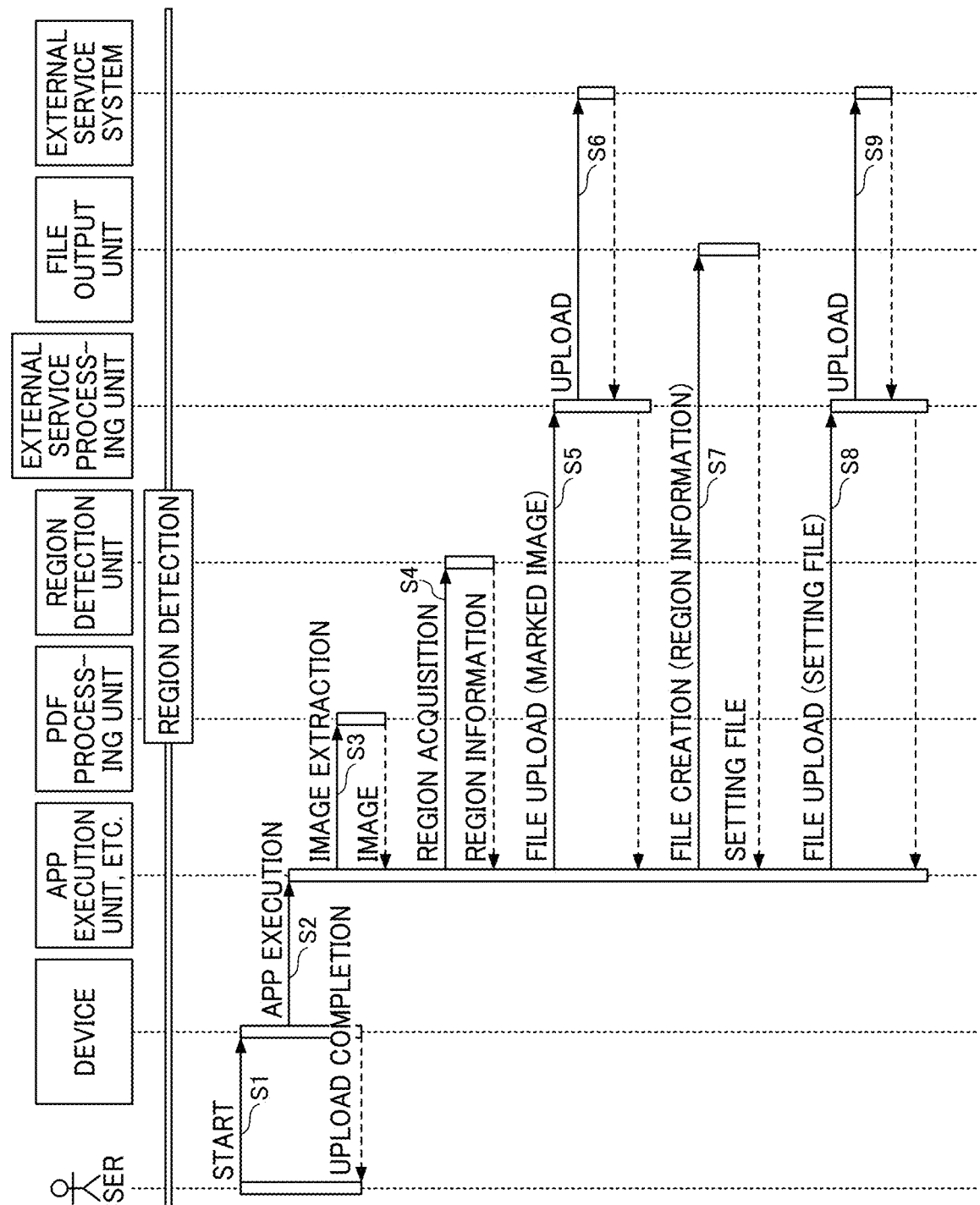
FIG. 10 is a sequence diagram illustrating an example of a procedure in which the information processing system acquires region information from a form having a region marked by an administrator and creates a setting file.

FIG. 10 is a sequence diagram illustrating an example of a procedure in which the information processing system 10 acquires region information from a form having a region marked by the administrator and creates a setting file.

S1: The administrator operates the device 20 to log into the information processing system 10, and selects the OCR region designation app from a list of apps displayed in an initial screen. In response to this, the display control unit 22 of the device 20 causes the region registration screen 610 to be displayed. The administrator positions the form having a marked region onto the contact glass, and presses the start button 613. The image data generation unit 24 generates image data of the form and converts the image data into a PDF file.

S2: The second communication unit 21 of the device 20 transmits the PDF file along with an OCR-region-designation-app execution request to the information processing system 10.

S3: The communication unit 19 of the information processing system 10 receives the PDF file. The app execution unit 46 requests the input/output processing unit 48 to execute the OCR region designation app by designating the app ID of the OCR region designation app. The input/output processing unit 48 executes the app with reference to the app processing information 53 associated with the app ID of the OCR region designation app. The input/output processing unit 48 first designates the PDF file and requests the PDF processing unit 64 to extract image data. The PDF processing unit 64 extracts the image data of the form from the PDF file.

S4: The input/output processing unit 48 transmits a request to acquire the region along with the image data to the region detection unit 65. The region detection unit 65 acquires the region from the image data on the basis of color information of the image data.

Figure 11A:
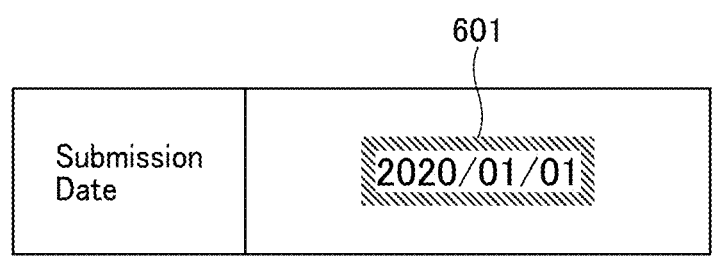
FIGS. 11A to 11C are diagrams describing an example of detection of a region from image data.
Figure 11B:
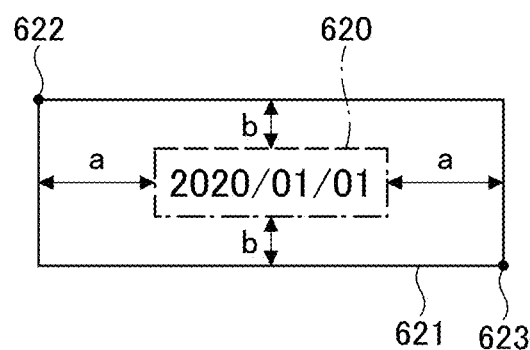
Figure 11C:
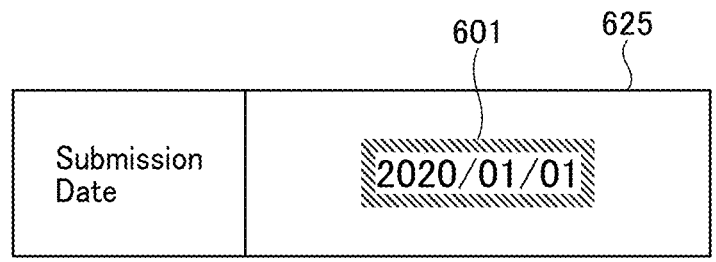

FIGS. 11A to 11C are diagrams describing detection of a region from image data. As illustrated in FIG. 11A, the colored portion 601 designated with a marker has RGB values that are not the black and white values. Since the RGB values for black are (0, 0, 0) and the RGB values for white are (255, 255, 255), the region detection unit 65 detects the colored portion 601 having RGB values of (1, 1, 1) to (254, 254, 254), for example. When the color of the marker is predetermined, the developer can narrow the range of the RGB values in accordance with the color, so that the colored portion 601 can be detected more accurately. For example, even if the form is a color form, with the use of a marker of a color other than the colors of the form, the region detection unit 65 can detect the colored portion 601 from the color form.

FIG. 11B illustrates the detected colored portion 601. The region detection unit 65 sets a circumscribed quadrangle 620 of the detected colored portion 601. The region detection unit 65 sets margins above, below, on the left, and on the right of the circumscribed quadrangle 620, and determines a region 621 including the margins. In FIG. 11B, a margin of a [mm] is set on the right and left sides and a margin of b [mm] is set above and below the circumscribed quadrangle 620. The margins are set because misregistration may occur when the device 20 scans a form. Coordinates of an upper left corner 622 in FIG. 11B are the start X coordinate and the start Y coordinate of the region information, and coordinates of a lower right corner 623 is the end X coordinate and the end Y coordinate of the region information.

As illustrated in FIG. 11C, the region detection unit 65 may detect a frame 625 on the outer side of the colored portion 601 detected based on the RGB values. The region detection unit 65 searches for black pixels toward the outer side in the vertical direction of the colored portion 601 (the circumscribed quadrangle 620). If a black pixel is found, the region detection unit 65 traces the black pixels. If the region detection unit 65 returns to the original position, the region detection unit 65 determines that the frame 625 on the outer side is detected. This enables detection of a largest region in which data is to be filled in, and makes it easier for the region identification unit 67 to identify the data even if misregistration may occur when the device 20 scans the form.

The administrator can set a setting such as how much margins are to be set by the region detection unit 65 for a region designated with a marker. Details will be described in relation to an association screen 640-2 in FIG. 16C. The region detection unit 65 sets region information on the basis of the setting set in the association screen 640-2.

S5: The input/output processing unit 48 designates the image data in which the region is designated with a marker and requests the external service processing unit 62 to upload the image data to the external service system 40.

S6: The external service processing unit 62 acquires the authentication information of the administrator for the external service system 40 from the user management unit 44. Thus, the external service processing unit 62 logs into the external service system 40 and stores the image data to a top folder for the administrator (or a folder designated by the administrator). When the administrator designates the file name of the setting file in the region registration screen 610, the external service processing unit 62 assigns the same file name to the file of the image data. When the file name is not set, the current date and time or the like is set as the file name.

S7: The input/output processing unit 48 then designates the region information detected by the region detection unit 65 and requests the file output unit 66 to create a setting file. The file output unit 66 determines an ID and sets the region information in the determined column of the CSV file to generate the setting file. At this point, information is entered in columns A to E of Table 4.

S8: The input/output processing unit 48 then designates the setting file and requests the external service processing unit 62 to upload the setting file to the external service system 40.

S9: The external service processing unit 62 has already logged in the external service system 40. Thus, the external service processing unit 62 stores the setting file in the top folder for the administrator (or the folder designated by the administrator). When the administrator designates the file name of the setting file in the region registration screen 610, the external service processing unit 62 assigns this file name to the setting file. When the file name is not set, the current date and time or the like is set as the file name. Since the image data and the setting file have the same file name, the administrator can easily determine the image data from which the setting file is created.

<Registration of Other Information to Setting File>

Figure 12:
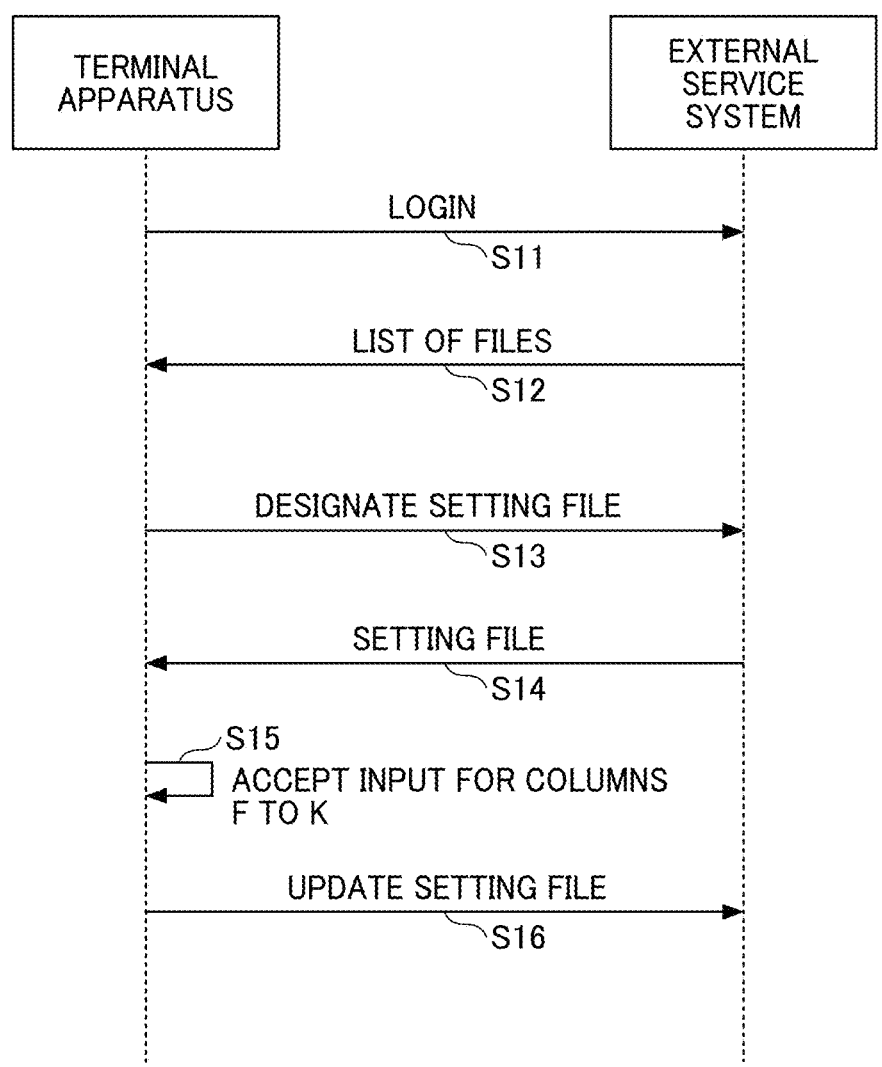
FIG. 12 is a sequence diagram illustrating an example of a procedure in which the administrator sets information in columns F to K of the setting file.

Setting of information in columns F to K of the setting file will be described with reference to FIGS. 12 and 13. FIG. 12 is a sequence diagram illustrating an example of a procedure in which the administrator sets information in columns F to K of the setting file;

S11: After registering the setting file to the external service system 40, the administrator operates the terminal apparatus 30 to cause the terminal apparatus 30 to access the external service system 40. The administrator inputs their authentication information to log into the external service system 40.

S12: Since the external service system 40 is a storage service, the external service system 40 transmits, to the terminal apparatus 30, a list of files registered by the administrator. For example, a list of files in the top folder is transmitted. When there is no file in the top folder, the administrator designates a layer. The list of files includes the setting file and the file of the image data that are registered by the administrator from the device 20.

S13: The administrator selects the setting file to check the content of the setting file or to set information in columns F to K. The operation accepting unit 33 of the terminal apparatus 30 accepts the selection. The first communication unit 31 designates the file ID of the setting file and requests the external service system 40 to transmit the setting file.

S14: A communication unit (not illustrated) of the external service system 40 receives a request for the setting file, and transmits the setting file to the terminal apparatus 30.

S15: The administrator checks the content of the setting file, and sets the information in columns F to K. The operation accepting unit 33 of the terminal apparatus 30 accepts the setting.

S16: In response to the administrator performing, for example, an operation for uploading the setting file, the first communication unit 31 transmits the setting file in which the information is set in columns A to K to the external service system 40.

In the manner as described above, the setting file is registered to the external service system 40.

FIG. 13 is a diagram describing an example of a correspondence between the setting file and the form. As described in Table 4, the administrator sets the format, the CSV column name, the CSV position (column), the CSV position (row), the OCR language, and the order used in the file name. Information need not be setting in all the columns.

In the example of FIG. 13, a setting is made such that data acquired based on region information having ID=1 corresponds to "Document name" at the CSV column name. The "Document name" is used first in the file name. A setting is made such that data acquired based on region information having ID=2 corresponds to "Submission date" at the CSV column name. Since the CSV position for the submission date is set as column 3 and row 2, data acquired based on the region information having ID=2 is written to column 3 and row 2 of the file. The "submission date" is used second in the file name. A setting is made such that data acquired based on region information having ID=3 corresponds to "Subtotal" at the CSV column name. Since the CSV position for the "Subtotal" is set as column 4 and row 2, data acquired based on the region information having ID=3 is written to column 4 and row 2 of the file.

<Association Between App and Region Information>

Figure 14A:
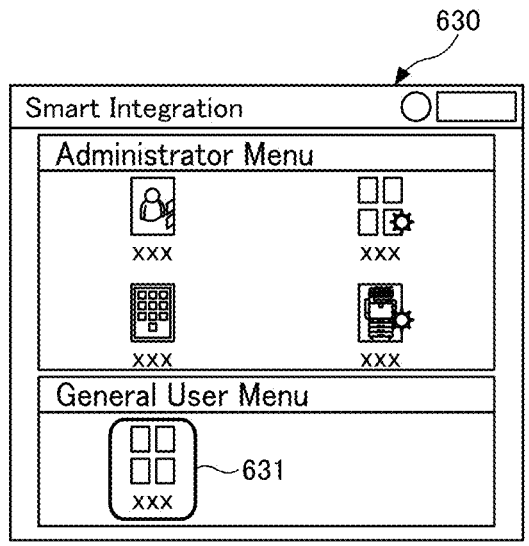
FIGS. 14A to 14C illustrate an example of screens displayed by the terminal apparatus to associate an app and region information with each other.

Association between an app and region information will be described next with reference to FIG. 14A to FIG. 15. FIGS. 14A to 14C illustrate an example of screens displayed by the terminal apparatus 30 in relation to association between the app and the region information. The administrator operates the terminal apparatus 30 to cause the terminal apparatus 30 to communicate with the information processing system 10.

FIG. 14A is an initial screen 630 displayed in response to the administrator logging into the information processing system 10. An operation menu permitted for the administrator is displayed. To associate an app with the setting file, the administrator selects an icon 631 for displaying a list of apps.

As illustrated in Table 2, since usable apps and external service system information are registered for each user in the user management unit 44, the information processing system 10 can provide the terminal apparatus 30 a list of apps which the administrator is permitted to use for each external service system 40.

Figure 14B:
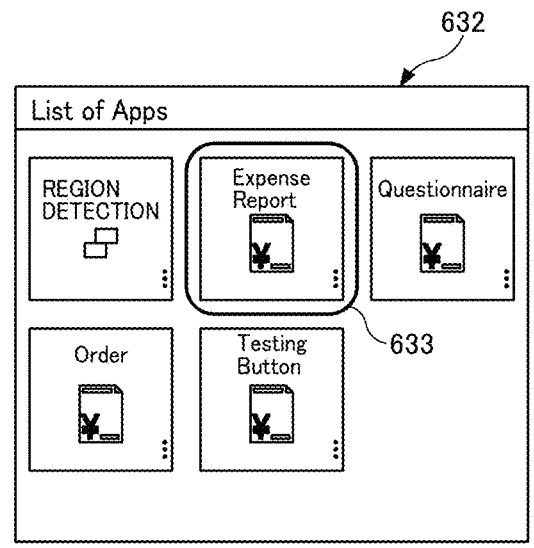

FIG. 14B illustrates an example of an app list screen 632. In the app list screen 632, a list of apps which the administrator is permitted to use is displayed. The administrator selects an app 633 (for example, an expense report app) to be associated with the setting file registered to the external service system 40 in the app list screen 632. The operation accepting unit 33 accepts selection of the app 633, so that an association screen 640 illustrated in FIG. 14C is displayed. The association screen 640 includes an external service system selection field 641, an upload destination folder field 642, and a setting file field 643. The external service system selection field 641 is a field in which the administrator sets the external service system 40 serving as the storage destination of a file to which data acquired from the region is written. Thus, the administrator can change the external service system 40 associated with the app in advance or set the new external service system 40. The upload destination folder field 642 is a field in which the administrator sets a folder serving as the storage destination of the file to which data acquired from the region is written. In response to the administrator pressing a select folder button 642a, the information processing system 10 logs into the external service system 40 with authentication information of the administrator for the external service system 40, and a top folder accessible by the administrator in the external service system 40 is displayed on the terminal apparatus 30. The administrator can select any folder. The setting file field 643 is a field in which the administrator selects the setting file to be associated with the app. In response to the administrator pressing a select file button 644, the information processing system 10 logs into the external service system 40 with authentication information of the administrator for the external service system 40, and a top folder accessible by the administrator in the external service system 40 is displayed on the terminal apparatus 30. The top folder (or the folder set by the administrator) includes the setting file registered by the information processing system 10 and updated by the administrator. There is no setting file in the top folder, the administrator can search for the setting file from a lower folder of the top folder.

Figure 14C:
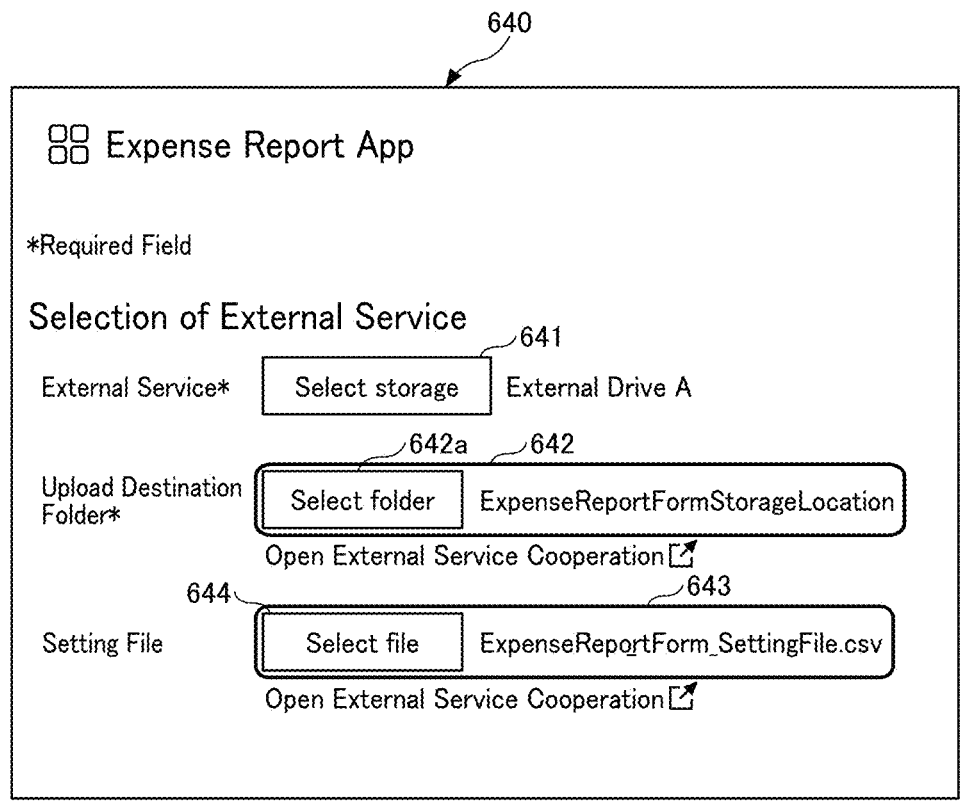

FIG. 15 is a sequence diagram describing an example of a process in which the administrator associates an app and a setting file with each other via the screens illustrated in FIGS. 14A to 14C. The process of FIG. 15 starts when the screen of FIG. 14A is displayed.

S21: The administrator logs into the information processing system 10, and inputs an operation for displaying the list of apps to the terminal apparatus 30 in the initial screen 630. The operation accepting unit 33 of the terminal apparatus 30 accepts the operation. The first communication unit 31 requests the information processing system 10 to transmit a list of apps.

S22: The communication unit 19 of the information processing system 10 receives a request for the list of apps. The terminal screen providing unit 42 acquires apps associated with the user ID of the administrator from the user management unit 44. The terminal screen providing unit 42 creates screen information of the app list screen including the apps which the administrator is permitted to use for each external service system 40. The communication unit 19 transmits the screen information of the app list screen to the terminal apparatus 30.

S23: The administrator selects an app to which the setting file is associated. The operation accepting unit 33 of the terminal apparatus 30 accepts the selection. Then, the terminal apparatus 30 displays the association screen 640 in the above-described manner.

S24: The administrator presses the select file button 644 in the association screen 640. The operation accepting unit 33 accepts the pressing, and the first communication unit 31 transmits a request for a list of files stored in the external service system 40 set in the association screen 640 to the information processing system 10.

S25: The communication unit 19 of the information processing system 10 receives the request for the list of files, and the app execution unit 46 designates the external service system 40 and requests the input/output processing unit 48 to transmit the list of files. The input/output processing unit 48 requests the external service processing unit 62 corresponding to the external service system 40 to transmit the list of files. The external service processing unit 62 acquires the authentication information of the administrator for the external service system 40 (associated with the app or set by the user in the association screen 640) from the user management unit 44 and transmits a request for the list of files to the external service system 40.

S26: The external service system 40 permits login of the administrator based on the authentication information of the administrator and acquires the list of files associated with the administrator. The list of files is transmitted to the terminal apparatus 30. In FIG. 15, it is assumed that the external service system 40 storing the setting file is the same as the external service system 40 storing the file of data acquired from the region. However, the external service systems 40 may be different. In this case, the administrator selects the setting file, and then changes the external service system 40 in the association screen 640.

S27: The display control unit 32 of the terminal apparatus 30 displays the list of files. The administrator selects the setting file to be associated with the app. The operation accepting unit 33 of the terminal apparatus 30 accepts the selection.

S28: The first communication unit 31 of the terminal apparatus 30 designates the identification information of the setting file, the identification information of the app, the external service system 40, and the upload destination folder and transmits a request for associating the setting file and the app with each other to the information processing system 10.

S29: The communication unit 19 of the information processing system 10 receives the request for associating the setting file and the app with each other. The app data management unit 41 registers the setting file and the app to the app data 43 in association with each other. That is, the app data management unit 41 registers the applicationId, the applicationName, the fileId, the fileName, and the upload destination folder in association with one another. The external service system 40 is registered to the app processing information 53.

In the manner described above, the app and the setting file are associated with each other. Thereafter, the general user just presses an icon on the device 20 to be able to output data of the region of the form to the file.

In FIG. 15, the method in which the administrator associates the app and the region information in the association screen 640 has been described. However, the app and the region information may be associated with each other when the region information is registered. In this case, for example, a field for inputting the app name is displayed in the region registration screen 610 illustrated in FIG. 9, for example. The administrator inputs the app name of the app to be associated with the setting file. After creating the setting file, the information processing system 10 can associate the app having the input app name with the setting file. That is, when the administrator sets the app name and causes a form to be scanned, the setting file is generated and the setting file and the app identified with the input app name are associated with each other.

Figure 16A:
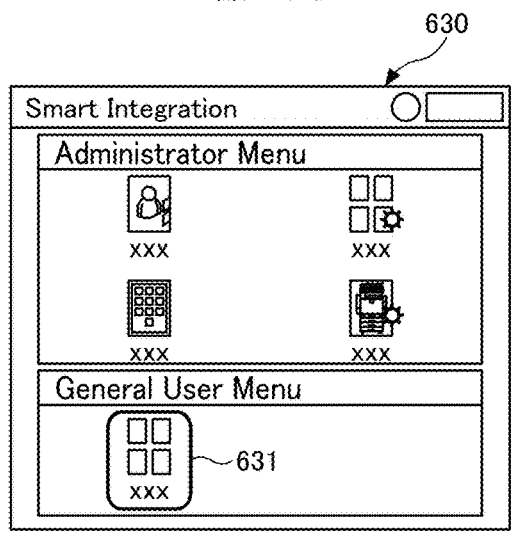
FIGS. 16A to and 16C are diagrams illustrating a modification of the association screens.
Figure 16B:
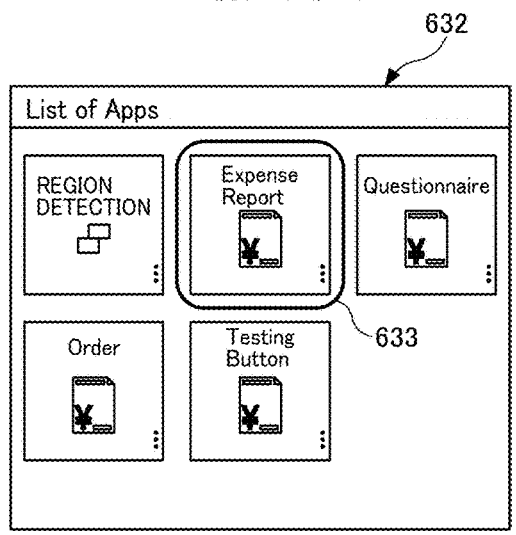
Figure 16C:
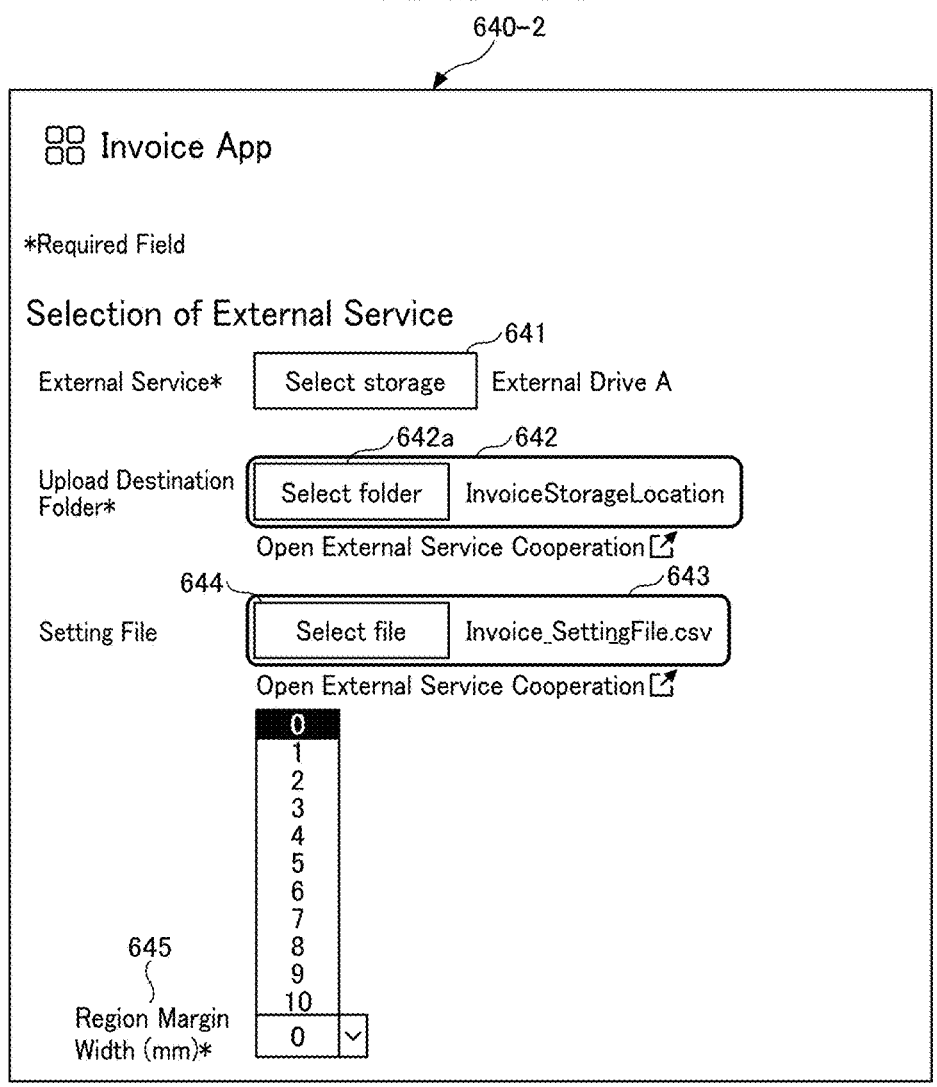

The administrator can set a margin width of the region in the association screen 640 illustrated in FIG. 14C. FIGS. 16A to 16C illustrate a modification of the association screen 640. In description of FIGS. 16A to 16C, differences from FIG. 14C will be mainly described. An association screen 640-2 illustrated in FIG. 16C has a region margin width setting field 645. In the region margin width setting field 645, the administrator can set a degree at which the region information (OCR region) is to be expanded from the region specified with a marker. Thus, the region information in Table 4 indicates a region broader than the region colored with the marker. Even if the region designated by the administrator with the marker is narrower than the area to be marked or the user fills in over the region of the form, the OCR processing unit 68 can perform OCR processing on characters.

However, the setting is not limited to this example. The administrator may set whether the region information indicates an inner region of the line drawn with the marker (for example, in the case where the OCR region is surrounded with the line drawn with the marker, the line is not included) or indicates a region including the line in the association screen 640-2.

The format in which the administrator designates a region such as the color, the type of the pen, and the shape may be accepted in the association screen 640-2. For example, the administrator can set a setting of surrounding the OCR region with a quadrangular frame drawn with a yellow marker, surrounding the OCR region with a circular frame with a red pen, or filling the OCR region with a green marker.

<Reproduction of App>

Forms have various formats. Thus, positions of regions in which a user fills in data vary from form to form. Accordingly, in the present embodiment, the administrator can register region information in accordance with the format of each form. As one of methods for registering region information for each form, a method in which the administrator reproduces (copies) an app will be described.

Figure 17:
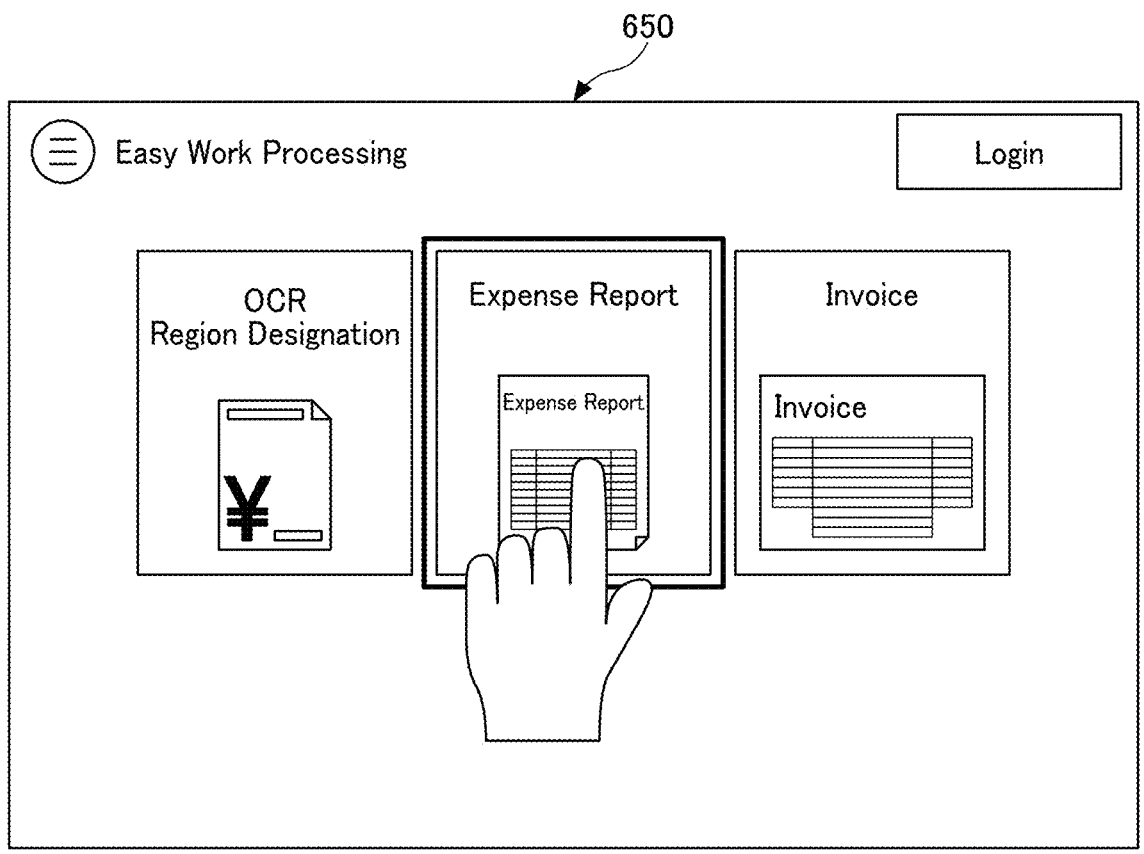
FIG. 17 is a diagram illustrating an example of a selection screen for some apps.

FIG. 17 illustrates an app selection screen 650 for some apps. In one example, when the some apps include an expense report app, an invoice app, and an OCR region designation app, region information of an expense report is associated with the expense report app and region information of an invoice is associated with the invoice app in the app data 43. When a user desires to acquire data from a region of an expense report, the user starts the expense report app and scans the expense report to output data of the expected region. When a user desires to acquire data from a region of the invoice, the user starts the invoice app and scans the invoice to output data of the expected region.

The process performed by each app is written in the app processing information 53. The processes performed by the expense report app and the invoice app are different in the file storage destination, the upload destination folder, and the setting file but the same in executed components. Thus, when the administrator reproduces the expense report app or the invoice app, designation of a region, acquisition of a region, creation of a setting file, and association of the setting file and the app generated by reproduction are performed. In this manner, the information processing system 10 can create an app corresponding to any form.

Figure 18A:
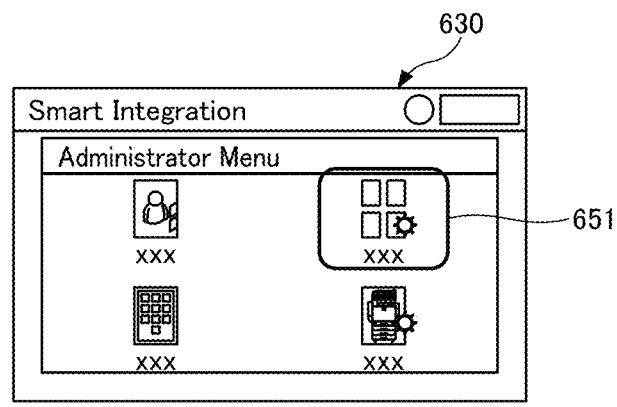
FIGS. 18A to 18C illustrate an example of screens operated by the administrator to reproduce an app.
Figure 18B:
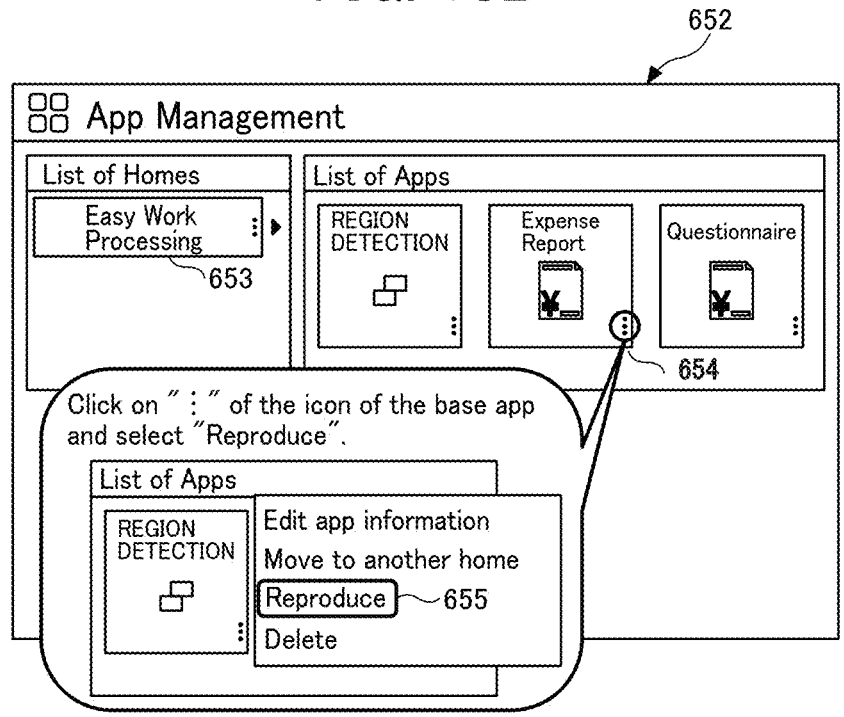
Figure 18C:
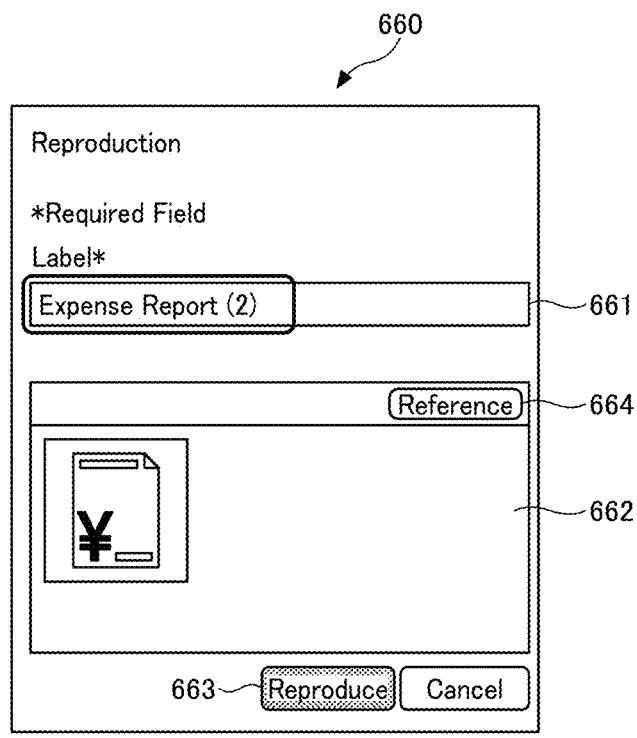

A method for reproducing (copying) an app will be described with reference to FIGS. 18A to 18C. FIGS. 18A to 18C illustrate an example of screens operated by the administrator to reproduce an app. FIG. 18A is the initial screen 630 displayed by the terminal apparatus 30 in response to the administrator logging into the information processing system 10. In the initial screen 630, a setting button 651 that allows the administrator to set various settings is displayed.

FIG. 18B is an app management screen 652 displayed in response to pressing of the setting button 651. In the app management screen 652, a group name 653 of a group of some apps is displayed. Note that screen transition is merely an example used in description. Thus, an illustrated screen may be omitted or a new screen may be added.

On the right side of the group name 653, a list of apps belonging to this group is displayed. The apps displayed in the list are apps for which the administrator has the use right. The apps include apps exclusively used by the administrator and apps used also by other users. The administrator presses a setting button 654 of an app to be reproduced. In response to the administrator pressing the setting button 654, a menu is displayed, which includes a reproduce button 655.

In response to the administrator pressing the reproduce button 655, a reproduce app setting screen (popup screen) 660 illustrated in FIG. 18C is displayed. The reproduce app setting screen 660 includes an app name setting field 661, an icon list field 662, and a reproduction request button 663. In the app name setting field 661, the administrator inputs any app name of a new app created by reproduction. The app name may be any name but a duplicate app name is rejected or a suffix number such as "-(2)" is appended. The app name may also be referred to as an icon name or a setting name.

In the icon list field 662, a list of icons is displayed. The administrator can select a desired icon. The administrator may press a reference button 664 to display other icons. In response to the administrator pressing the reproduction request button 663, the app ID of the app to be reproduced, the app name, and the icon are transmitted to the information processing system 10. The information processing system 10 receives these pieces of information. The app management unit 49 uses the app processing information 53 and the screen information 54 of the app to be reproduced to register a new app. Out of the app processing information 53, a non-duplicate ID is assigned as the app ID and the app name input by the administrator is set as the app name. The screen information is the same as that of the app to be reproduced except for the icon, which is set to the icon selected by the administrator. The fields such as the app processing information, the shared app, and the external service system 40 are the same as those of the app to be reproduced. For example, if the user can identify the app by the app name or the like, different icons need not be set for all the apps.

In the present embodiment, a new image processing region setting is added in response to reproduction of an app. However, the administrator may make a setting for associating a newly added image processing region and identification information for which selection is accepted by the device 20 in a form of addition of a setting and addition of an icon instead of copying of an app.

Figure 19:
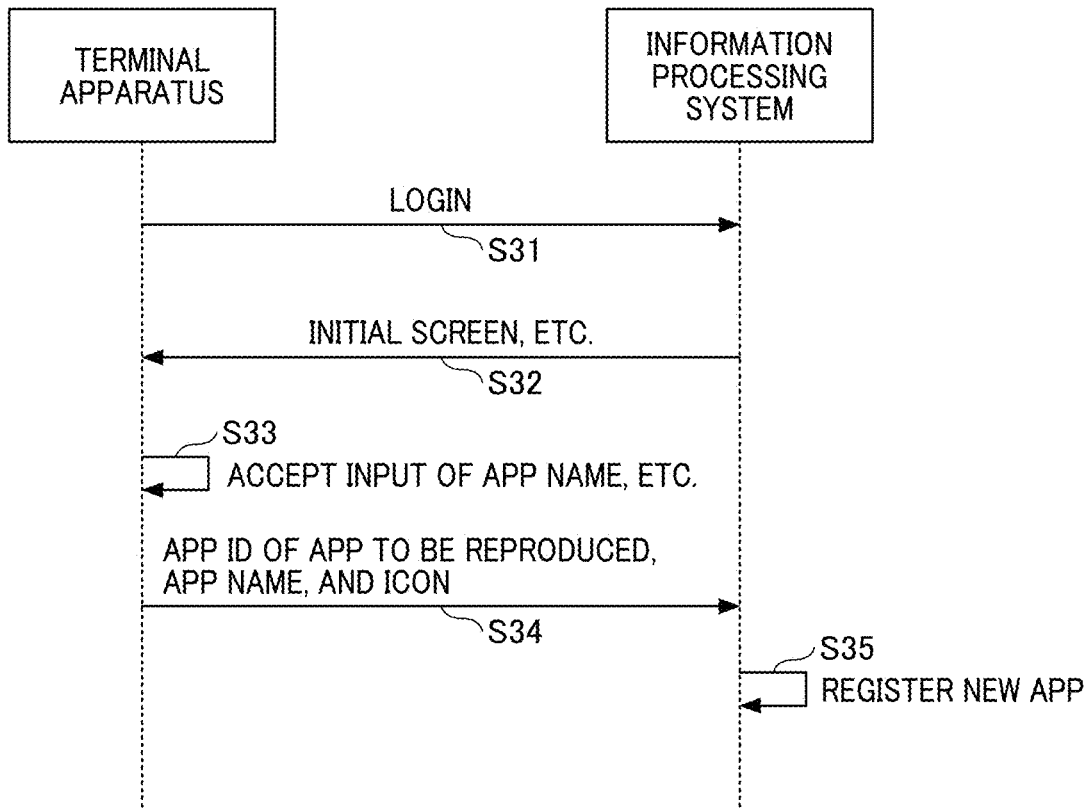
FIG. 19 is a sequence diagram illustrating an example of a procedure in which the information processing system registers a replica of an app.

FIG. 19 is a sequence diagram of an example of a procedure in which the information processing system 10 registers a replica of an app.

S31: The administrator inputs authentication information for the information processing system 10 to the terminal apparatus 30. The operation accepting unit 33 of the terminal apparatus 30 accepts the input. The first communication unit 31 transmits the authentication information to the information processing system 10, so that the administrator logs into the information processing system 10.

S32: In response to the login, the terminal screen providing unit 42 of the information processing system 10 transmits screen information of an initial screen to the terminal apparatus 30 via the communication unit 19. Thereafter, in response to an operation of the administrator, the terminal screen providing unit 42 transmits screen information of screens illustrated in FIGS. 18A to 18C to the terminal apparatus 30.

S33: The administrator inputs information such as the app name to the terminal apparatus 30. The operation accepting unit 33 accepts the input.

S34: The first communication unit 31 of the terminal apparatus 30 transmits the app ID of the app to be reproduced, the app name, and the icon to the information processing system 10.

S35: The communication unit 19 of the information processing system 10 receives these pieces of information. The app management unit 49 uses the app processing information 53 and the screen information 54 of the app to be reproduced to register a new app.

In this manner, the administrator can reproduce an app. The administrator associates a setting file with a new app generated by reproduction and can acquire data from a predetermined region of a desired form.

The administrator can create a plurality of new apps from a single app to be reproduced. The information processing system 10 can accept selection of different setting files for the plurality of new apps. Reproducing an app is merely an example. Since it is sufficient that some kind of identification information can be assigned to the same processing flow, the identification information may be assigned to the same processing flow in a form of addition of an icon or addition of a setting.

<Acquisition of Data from Form Based on Association Between App and Setting File>

After association between the app and the setting file is completed, the user causes the device 20 to scan a form, so that the information processing system 10 can acquire data from the form.

Figure 20A:
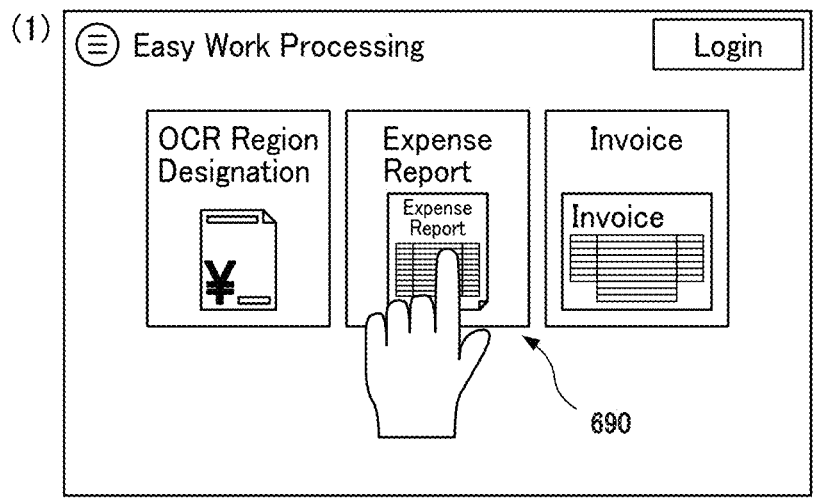

Acquisition of data from a form will be described with reference to FIGS. 20A to 21B. FIGS. 20A to 20C are diagrams illustrating an example of transition of screens displayed by the device 20.

(1) As illustrated in FIG. 20A, the user causes the device 20 to display the app list screen. For example, when the user desires to report expenses, the user selects the icon of the expense report app. The user knows which form corresponds to which app. However, the app name displayed at an icon 690 of the app desirably coincides with the name of the form (original). The app name may also be referred to as an icon name or a setting name. That is, the icon 690 desirably includes the name of the form. The icon 690 desirably further includes a thumbnail of the form. This reduces the likelihood of the user selecting an icon not corresponding to the form. Alternatively, the thumbnail of the form may be displayed in response to the user pressing the icon 690. The user can enlarge the displayed thumbnail or display part of the thumbnail to check the icon 690.

A link may be embedded in the icon 690. The link has, for example, a URL including the app ID or a URL associated with the app ID in the information processing system 10. In response to the user pressing the icon 690, the device 20 accesses the URL to notify the information processing system 10 of the app ID.

In response to the user selecting a form not corresponding to the icon 690, the device 20 may warn the user. For example, the device compares image data of the scanned form with the image data associated with the icon 690. If the pieces of image data are different from each other, the device 20 displays a message indicating "whether to continue the processing" to give an inquiry to the user. The information processing system 10 may compare the pieces of image data. Examples of the comparison method include a method in which the device 20 or the information processing system 10 performs pattern matching on the image data of the scanned form on the basis of the image data associated with the icon 690. In the case where the app ID is printed as a barcode on a form, there is a method in which the device 20 or the information processing system 10 compares this app ID with the app ID associated with the icon 690.

An object selected by the user may be an icon, and information transmitted by the device 20 to the information processing system 10 may be a character string of the app ID, the set number, or the like. That is, the object selected by the user need not be the app ID (identification information).

(2) When the device 20 scans an expense report form, the user prepares the expense report form (FIG. 20B). The user may manually fill in the expense report form or the device 20 may print the expense report form. The expense report form need not be printed by the user (and may be a publicly issued document, a document sent from another business entity, or the like).

(3) The app selected by the user displays a screen illustrated in FIG. 20C on the basis of the screen information 54. The screen illustrated in FIG. 20C is substantially the same as that of FIG. 9. The user positions the prepared expense report form on the contact glass and presses the start button 613 to cause the device 20 to scan the expense report form.

Image data of the form is transmitted to the information processing system 10, and a file is output through a process described next.

FIGS. 21A and 21B are diagrams describing an example of files stored in the external service system 40. FIG. 21A illustrates an example of an upload destination folder in the external service system 40. That is, the file output by the information processing system 10 is stored in the upload destination folder set by the administrator in FIG. 14C. The file layer of "My Drive>ExpenseReportFormStorageLoation" illustrated in FIG. 21A is an example. The administrator can designate any folder for which the administrator has an access right.

FIG. 21B illustrates two files stored in the upload destination folder. Two files are generated in response to a single scan operation. A. A CSV file 681 in which data acquired from the region of the form is stored. B. A PDF file 682 including the image data of the form.

A different CSV file is created by the same app in response to each scan operation. Since the file name includes the submission date, the file is not overwritten. On the other hand, data acquired by the same app may be desirably added to the same CSV file even if the timing of the scan operation differs. This method will be described later. In this manner, a person in charge at the general affairs department or the like simply accesses to the single CSV file to reimburse for data input by each employee.

<<When Device 20 does not Scan Form>>

In description of FIGS. 20A to 20C, the device 20 scans the expense report form.

However, the information processing system 10 can receive image data of the form from the terminal apparatus 30 or the like and acquire data from the region of the image data. In this case, the terminal apparatus 30 transmits the image data of the form to the information processing system 10 in the following manner.

The user uses a word processing application that operates on the terminal apparatus 30 to display the expense report form and inputs information. Thus, the information is represented in character code. The user causes the terminal apparatus 30 to access the information processing system 10, logs into the information processing system 10, and causes the list of apps to be displayed. The screen displayed on the terminal apparatus 30 is substantially the same as the screen illustrated in FIG. 20A. Thus, the user selects a desired app. The terminal screen providing unit 42 of the information processing system 10 transmits screen information of a screen that can accept the expense report form to the terminal apparatus 30. If the user selects the PDF file including the image data of the expense report form in this screen, the terminal apparatus 30 can transmit the PDF file to the information processing system 10.

Thus, even if the user does not print the form, the information processing system 10 can acquire data from the form. In this case, processing performed by the device 20 in a process illustrated in FIG. 22 described below is performed by the terminal apparatus 30.

<Operation Procedure>

Figures 22, 22A:
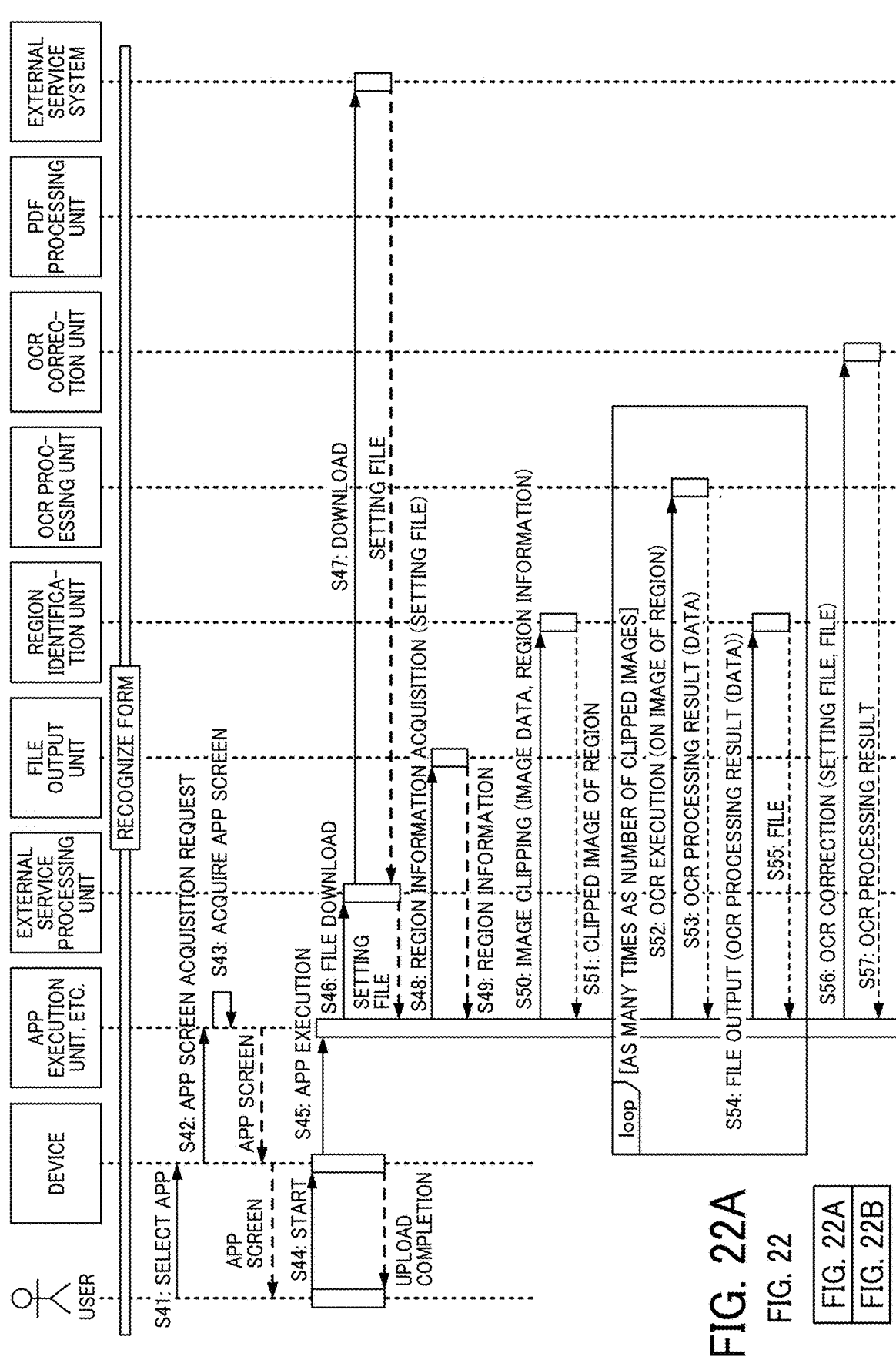
FIGS. 22A and 22B are a sequence diagram illustrating an example of a procedure in which the information processing system receives a Portable Document Format (PDF) file including image data of a form from the device and acquires data from a region.
Figure 22B:
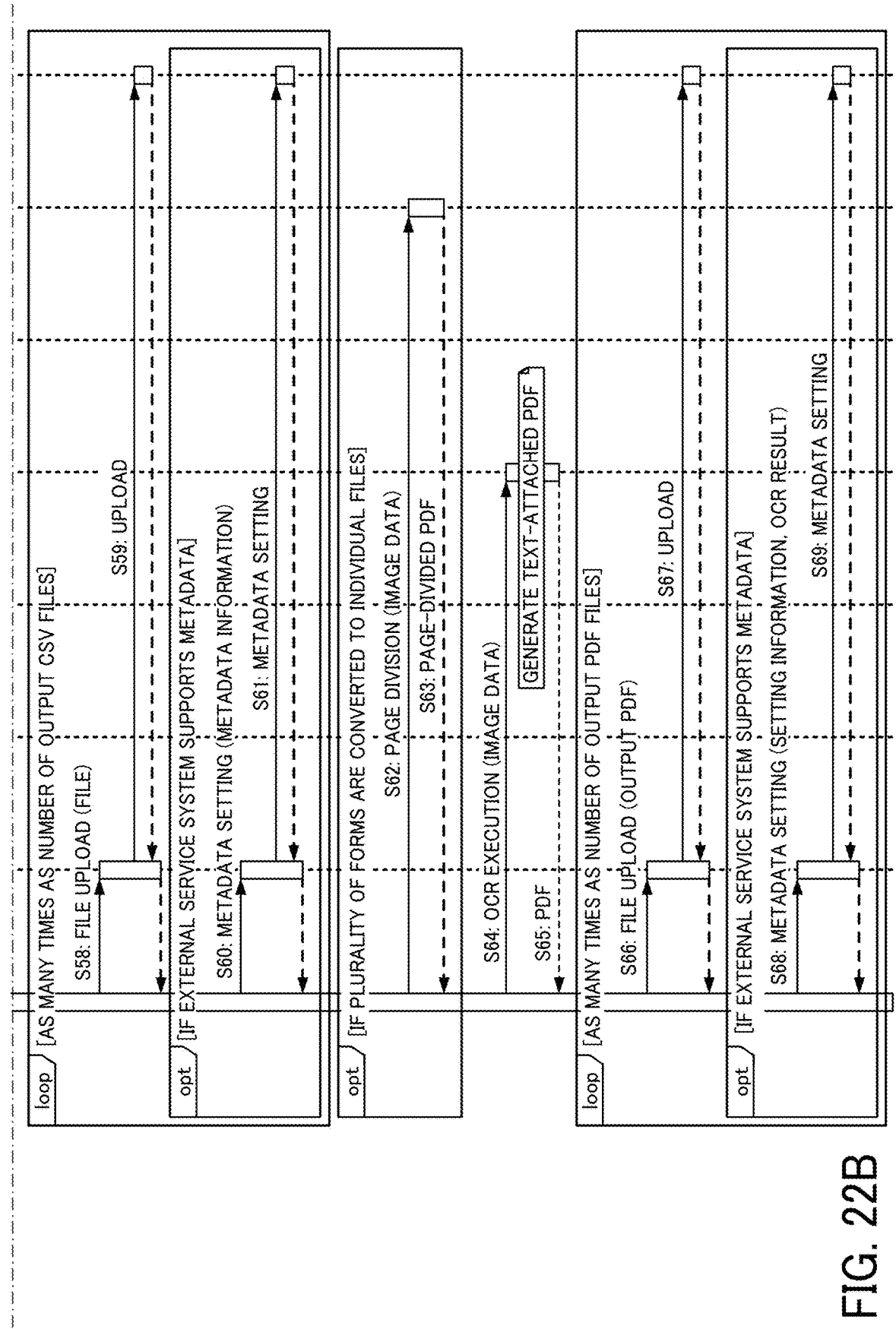

FIG. 22 is a sequence diagram illustrating an example of a procedure in which the information processing system 10 receives a PDF file including image data of a form from the device 20 and obtains data from a region.

S41: The user prints the form, and operates the device 20 to input their authentication information for the information processing system 10. The operation accepting unit 23 of the device 20 accepts the input of the authentication information. The second communication unit 21 transmits the authentication information to the information processing system 10. Consequently, the user logs into the information processing system 10. In response to the login, the display control unit 22 of the device 20 displays a list of apps for which the user has the use right (FIG. 20A). The user selects, for example, an app having an app name that matches the name of the printed form. The operation accepting unit 23 accepts the selection.

S42: The second communication unit 21 of the device 20 designates the app ID and transmits an app screen acquisition request to the information processing system 10.

S43: The communication unit 19 of the information processing system 10 receives the app screen acquisition request. The device screen providing unit 47 acquires the screen information 54 of the app identified by the app ID from the app management unit 49. The screen information 54 of the app screen of the app is transmitted to the device 20. In this manner, the display control unit 22 of the device 20 displays the app screen (FIG. 20C).

S44: The user positions the printed form onto the contact glass, and presses the start button 613. The operation accepting unit 23 of the device 20 accepts the pressing. The image data generation unit 24 generates image data of the form, and converts this image data into a PDF file.

S45: The second communication unit 21 of the device 20 designates the app ID of the app and the PDF file and requests the information processing system 10 to execute the app.

S46: The communication unit 19 of the information processing system 10 receives the app execution request. The app execution unit 46 starts execution of the app. The app execution unit 46 designates the app ID and requests the input/output service unit 16 to execute the app. The input/output service unit 16 acquires the app processing information 53 via the app management unit 49. In this manner, the processing flow of the app is acquired. The input/output processing unit 48 acquires the app data 43 associated with the app ID from the app data storage unit 13. In the manner, the setting file associated with the app can be identified.

Based on the app data 43 and the app processing information 53, the input/output processing unit 48 requests the external service processing unit 62 to acquire the setting file.

S47: The external service processing unit 62 accesses the URL in the field "fileName" registered in the app data 43, and acquires the setting file from the external service system 40. If the app requested to be executed is not a shared app, the external service processing unit 62 uses the authentication information of the user for the external service system 40 to log into the external service system 40. If the app requested to be executed is a shared app, the external service processing unit 62 uses the authentication information of the administrator for the external service system 40 to log into the external service system 40.

S48: Based on the app processing information 53, the input/output processing unit 48 then requests the file output unit 66 to acquire the region information from the setting file.

S49: The file output unit 66 acquires all the region information from the predetermined columns and rows of the setting file and returns the region information to the input/output processing unit 48.

S50: Based on the app processing information 53, the input/output processing unit 48 then designates the image data and the region information and requests the region identification unit 67 to acquire (clip) the region from the image data.

S51: The region identification unit 67 identifies and acquires the region designated by the region information from the image data, and returns an image of the region to the input/output processing unit 48. The region identification unit 67 need not acquire (clip) the region from the image data. In this case, the OCR processing unit 68 may perform OCR processing on the region of the image data identified by the region information.

Steps S52 to S55 are repeatedly performed as many times as the number of regions.

S52: Based on the app processing information 53, the input/output processing unit 48 designates the image of the region and requests the OCR processing unit 68 to perform OCR processing. At this time, the input/output processing unit 48 may designate the region in association with the format and the OCR language acquired from the setting file.

S53: The OCR processing unit 68 uses a recognition engine corresponding to the format and the OCR language to perform OCR processing on the region. The OCR processing unit 68 returns data converted into character codes (OCR processing result) to the input/output processing unit 48.

The recognition engine is, for example, a classifier that uses training data including sets of a character image and a character code to learn correspondences between the character image and the character code and outputs an OCR processing result (character codes) from an image. The more similar the training data such as training data in Japanese, English, numerals, or dates alone, the more the classification accuracy of the classifier improves. If a plurality of kinds of data such as pieces of data in Japanese, English, numerals, and dates coexist in the training data, the classifier can classify various kinds of data but the classification accuracy tends to decrease. Thus, the use of the recognition engine corresponding to the format and the OCR language implements an improved recognition accuracy.

In the present disclosure, machine learning is a technique that enables a computer to acquire a human-like learning ability. Machine learning refers to a technology that enables a computer to autonomously generate an algorithm for determination such as data identification from training data input to the computer in advance, and to apply the generated algorithm to new data to make a prediction. The machine learning method may be any method such as supervised learning, unsupervised learning, semi-supervised learning, reinforcement learning, and deep learning, or any combination of these. That is, any machine learning method may be used. The recognition engine need not be generated as a result of machine learning.

S54: Based on the app processing information 53, the input/output processing unit 48 then designates the data acquired from the region, the CSV column name, the CSV position, and the file name (acquired from the setting file), and requests the file output unit 66 to output the file including the data.

S55: The file output unit 66 writes the CSV column name at the start of the column, writes the data in the cell of the CSV file designated by the CSV position, and returns the OCR processing result (CSV file) to the input/output processing unit 48. The CSV file is assigned the designated file name. The format of the output destination file is not limited to the CSV file format. The file may be a table-format file, a text file, or a file of another app.

S56: Based on the app processing information 53, the input/output processing unit 48 then designates the OCR processing result (CSV file), the format, and the OCR language and requests the OCR correction unit 69 to correct the OCR processing result. This format is acquired from the setting file illustrated in Table 4 and is set by the administrator.

Figure 23:
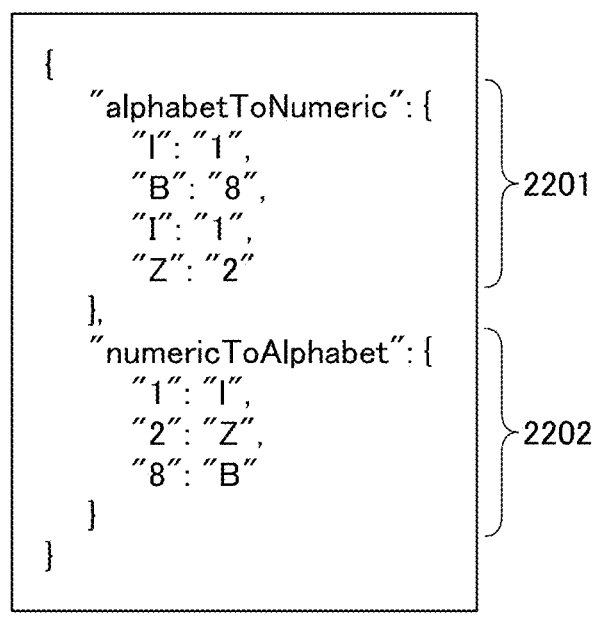
FIG. 23 is a diagram describing an example of correction of an OCR processing result.

FIG. 23 is a diagram describing correction of the OCR processing result. When the format is set in the setting file, the OCR correction unit 69 can correct the OCR processing result. Rules for a designated character string and a conversion character are defined for the OCR correction unit 69 as illustrated in FIG. 23. A conversion rule 2201 illustrated in FIG. 23 is a rule used for numeric characters. For example, since numerical values do not include I, B, and Z, I, B, and Z are corrected to 1, 8, and 2, respectively. A conversion rule 2202 illustrated in FIG. 23 is a rule used for English alphabets. For example, since English alphabets do not include 1, 2, and 8, 1, 2, and 8 are corrected to I, B, and Z, respectively.

S57: The OCR correction unit 69 returns the corrected OCR processing result (CSV file) to the input/output processing unit 48.

Steps S58 to S61 are repeatedly performed as many times as the number of CSV files. The number of CSV files created in response to a single scan operation may be one regardless of the number of forms, or may be as many as the number of pages of the form. Which case is adopted is set in the app.

S58: Based on the app processing information 53, the input/output processing unit 48 then requests the external service processing unit 62 to upload the OCR processing result (CSV file). The upload destination folder is set in the app data 43.

S59: The external service processing unit 62 stores the CSV file in the upload destination folder of the external service system 40.

S60: When setting of metadata is enabled, step S60 is performed. If the external service system 40 supports setting of metadata (items such as the character string and the date set by the user in the external service system 40), the user can set metadata to be associated with the uploaded CSV file. The user can input metadata via a screen displayed by the device 20. The input/output processing unit 48 requests the external service processing unit 62 to upload the metadata. The upload destination folder is the same as that of the CSV file.

S61: The external service processing unit 62 stores the metadata in the upload destination folder of the external service system 40.

S62: When a plurality of pieces of data of forms are obtained by scanning, the user may desire to store the pieces of data in individual files. In this case, based on the app processing information 53, the input/output processing unit 48 transmits, along with the image data of the plurality of pages, a page division request to the PDF processing unit 64.

This processing may be omitted. In such a case, the input/output processing unit 48 may store the plurality of pieces of data in a single file.

S63: The PDF processing unit 64 returns PDF files of the respective pages to the input/output processing unit 48.

S64: Based on the app processing information 53, the input/output processing unit 48 designates the PDF file and requests the OCR processing unit 68 to perform OCR processing.

S65: The OCR processing unit 68 performs OCR processing on the PDF file and sets character codes generated in the OCR processing as transparent text in the PDF file.

Steps S66 to S69 are performed as many times as the number of PDF files.

S66: Based on the app processing information 53, the input/output processing unit 48 requests the external service processing unit 62 to upload the text-attached PDF file. The upload destination folder is set in the app data 43.

S67: The external service processing unit 62 stores the text-attached PDF file in the upload destination folder of the external service system 40.

S68: If the external service system 40 supports the metadata (items such as the character string and the date set by the user in the external service system 40), the user can input metadata via a screen displayed by the device 20. The input/output processing unit 48 requests the external service processing unit 62 to upload the metadata. The upload destination folder is the same as that of the PDF file.

S69: The external service processing unit 62 stores the metadata in the upload destination folder of the external service system 40.

Consequently, a CSV file and a PDF file different from the CSV file are registered to the upload destination folder of the external service system 40.

<Display of CSV File and PDF File Registered to External Service System>

When a person in charge at a company calculates expenses of employees, the person in charge operates the terminal apparatus 30 to access the external service system 40. Since the person in charge is notified of the upload destination folder, the person in charge can acquire the CSV file and the PDF file with the terminal apparatus 30.

FIGS. 24A and 24B illustrate an example of a screen 670 that is displayed by the terminal apparatus 30 to present a list of files stored in the external service system 40. As illustrated in FIG. 24A, a PDF file 671 and a CSV file 672 are stored in the upload destination folder. FIG. 24B illustrates content of the CSV file 672 displayed by the terminal apparatus 30. That is, FIG. 24B illustrates data output from the form. In FIG. 24B, data acquired from two regions are stored. In each column, the CSV column name set in the setting file is also set, which allows the user to determine which data is stored in each column.

Figure 25:
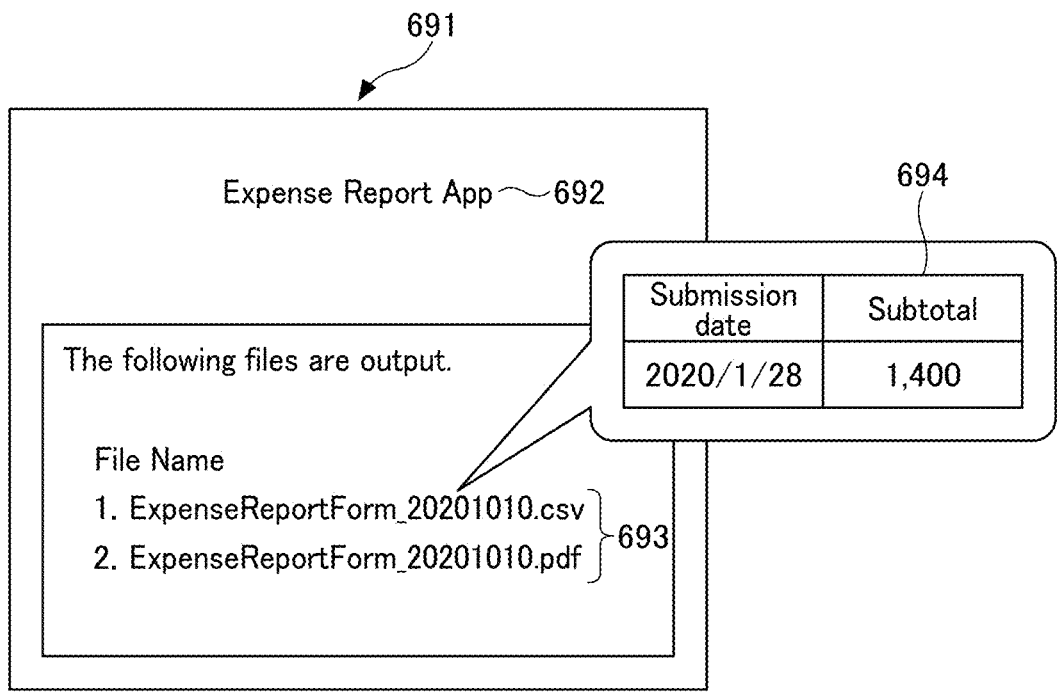
FIG. 25 is a diagram illustrating an example of an output data display screen displayed by the device.

The device 20 may also display the processing result as illustrated in FIG. 25. FIG. 25 illustrates an example of an output data display screen 691 displayed by the device 20. In the output data display screen 691, an app name 692 of the executed app and a list 693 of files output by the app are displayed. These pieces of information are transmitted from the information processing system 10 to the device 20. The CSV file includes content of the CSV file. In response to the user pressing the displayed text of the CSV file, the device 20 can display data 694 acquired from the region of the form and stored in the CSV file.

The user checks the file name and the data, and determines whether the form is correctly processed.

In FIG. 22, the image data subjected to the processing is the PDF file. However, the image data may be in any format such as JPEG, PNG, TIFF, or BMP.

<When Plurality of Forms are Scanned>

The case where a plurality of forms are scanned in a single scan operation will be described with reference to FIGS. 26A and 26B. FIGS. 26A and 26B are diagrams illustrating an example of a plurality of forms and an example of an output file. As illustrated in FIG. 26A, a plurality of forms are scanned in a single scan operation when the app is executed. A single scan operation indicates a scan operation performed in response to the start button 613 being pressed once. The device 20 sequentially scans a plurality of forms. The information processing system 10 acquires a plurality of pieces of data from the identical regions in pieces of image data of the respective forms.

FIG. 26B is a diagram illustrating a CSV file obtained when a plurality of forms are scanned in a single scan operation. The first row indicates data acquired from the first form, and the second row indicates data acquired from the second form. Since the plurality of pieces of the plurality of forms are gathered in a single CSV file in this manner, a person in charge can easily total the plurality of data or create a graph.

In the case where a plurality of forms are scanned in a single scan operation, the file output unit 66 increments the CSV position (start row) in the setting file by one. That is, data of each form may be written to a row under a row for the previous form.

In the case where a plurality of forms are scanned in a single scan operation, the information processing system 10 may output as many CSV files as the number of forms.

In the case where a plurality of forms are scanned in a plurality of scan operations (scanned at different timings), the information processing system 10 may output pieces of data to a single CSV file. There are cases where the external service system 40 merges CSV files or the information processing system 10 merges the CSV files.

In the case where the external service system 40 merges CSV files, the external service processing unit 62 requests the external service system 40 to merge the CSV files. When the same app is used, the file names of the CSV files include the same character string (for example, ExpenseReport-Form). Thus, the external service processing unit 62 designates the file name and can request merging of the CSV files. The external service system 40 adds data at the same column number of the CSV files requested to be merged, to data at the same column number of the CSV file already stored.

In the case where the information processing system 10 merges CSV files, the external service processing unit 62 designates the file name and downloads the CSV files from the external service system 40. The external service processing unit 62 adds data at the same column number of a newly created CSV file, to data at the same column number of the acquired CSV files. The external service processing unit 62 uploads the merged CSV file to the external service system 40.

As described above, the information processing system 10 can acquire the same region from the plurality of pieces of received image data. The OCR processing unit 68 can perform OCR processing on the same region in the plurality of pieces of received image data. The file output unit 66 can output a plurality of pieces of data generated from the same region of the plurality of pieces of image data to a single file.

As described above, the data output system 100 according to the present embodiment scans, with the device 20, a form having a marked region and stores region information for each form. The information processing system 10 acquires a region from the image data of the form transmitted from the device 20, performs OCR processing on the region, and outputs data of an OCR processing result to a file. This enables a file of a specific region clipped from a plurality of forms of the same kind to be easily created.

Other Application Examples

While the embodiment of the present disclosure has been described above, the present disclosure is not limited to such embodiment. Thus, various modifications and replacements may be made within the scope not departing from the gist of the present disclosure.

For example, in the present embodiment, data acquired from a region of a form is output to a file. However, the data may be emailed or displayed on the device 20 instead of being converted into a file.

In the present embodiment, OCR processing is performed on a designated region. However, other image processing (such as making processing or image clipping processing) may be performed. In such a case, the data output system 100 functions as an image processing system.

The data output system, as an example of the image processing system, and an image processing method carried out by the data output system, which are an example of another embodiment, will be described with reference to FIGS. 27A to 28.

Figure 27B:
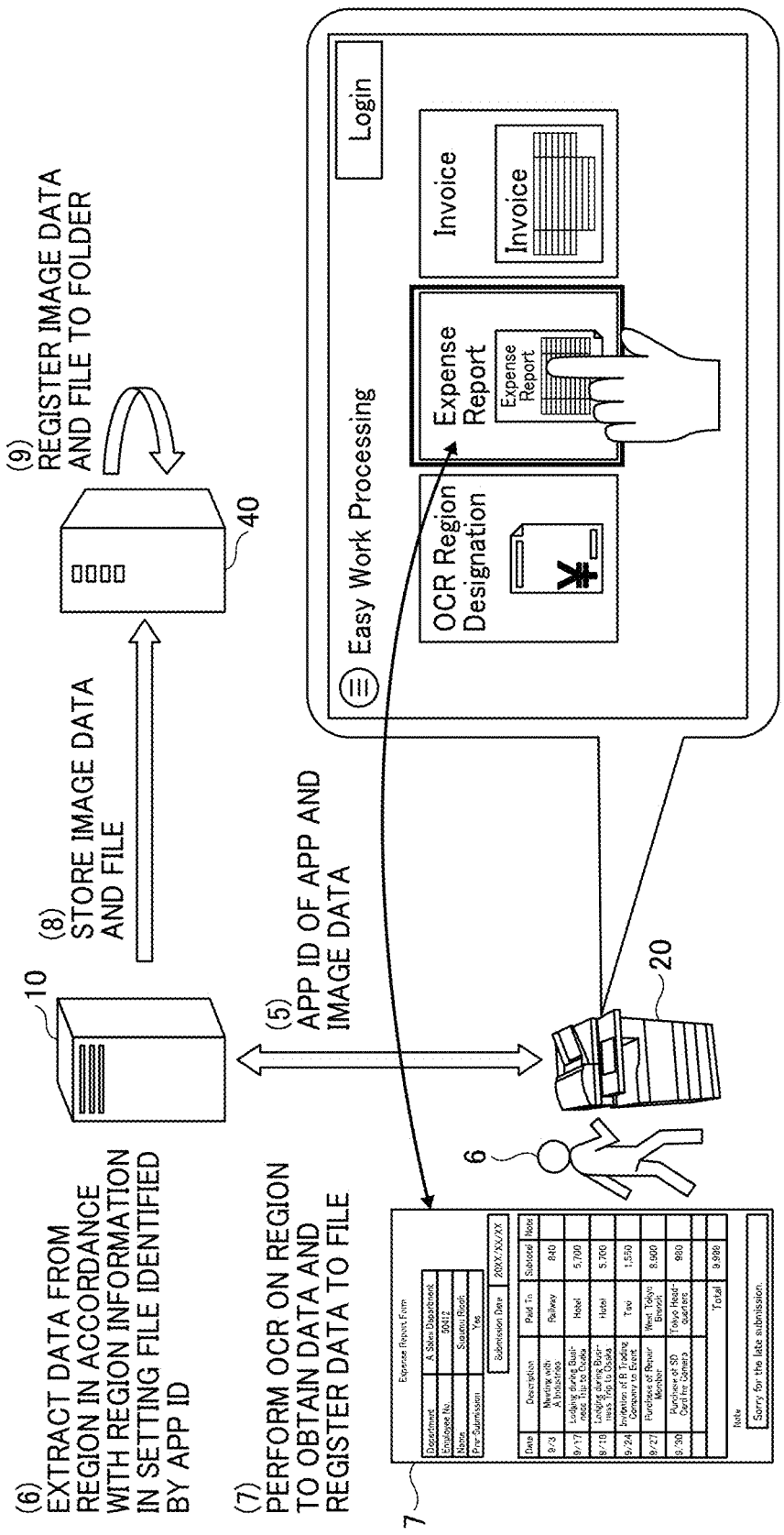

The data output system illustrated in FIGS. 27A and 27B is substantially the same as the data output system 100 illustrated in FIGS. 1A and 1B. Thus, differences will be mainly described.

Based on region information registered in advance based on a form having a marked region, the data output system illustrated in FIGS. 27A and 27B can perform image processing on a region in forms created daily, acquire data including the processed region, and output the data as an electronic file.

More specifically, as illustrated in FIGS. 27A and 27B, the device 20 of the data output system scans a form having a marked region and stores region information for each form in (7). The administrator associates the form and an icon of an app with each other.

Thus, an icon that accepts selection of the app and region information for which image processing is performed are associated with each other.

FIG. 28 is a diagram describing association between an icon and region information obtained from Tables 1 and 3. As described above, the app ID and the screen information are associated with each other in Table 1. The app ID and fileName including the region information are associated with each other in Table 3. Thus, the screen information and the region information are associated with each other in the information processing system 10.

This screen information includes an icon of the app.

As illustrated in FIG. 28, the app ID is associated with the icon of app and further with the region information. Since the icon and the region information are associated with each other, the information processing system 10 can perform image processing (OCR processing) on the region indicated by the region information associated with the icon selected by the user.

In the configuration example illustrated in FIG. 5, etc. is divided in accordance with main functions to make it easier to understand processes performed by the terminal apparatus 30, the device 20, and the information processing system 10. No limitation is intended by how the processes are divided or by the name of the processes. The processes performed by the terminal apparatus 30, the device 20, and the information processing system 10 may be divided into a greater number of processing units depending on the content of the processes. In addition, the division may be performed so that one processing unit contains more processing.

The group of apparatuses described in the above embodiment is merely one example of a plurality of computing environments in which the embodiment disclosed herein is carried out. In one embodiment, the information processing system 10 includes a plurality of computing devices such as server clusters. The plurality of computing devices communicate with each other via a communication link of any type including a network, shared memory, or the like and perform the processes disclosed herein.

The information processing system 10 may share the processing steps disclosed in the present embodiment, for example, steps of FIG. 22 or the like in various combinations. For example, a process performed by a predetermined unit may be performed by a plurality of information processing apparatuses of the information processing system 10. The information processing system 10 may be implemented by a single server apparatus or may be distributed to a plurality of apparatuses.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

In one aspect, an information processing system communicably connected with a device, comprising circuitry configured to: receive image data from the device; identify an OCR region of the image data, based on a region in which predetermined information is detected; and output data, the output data being obtained by performing OCR processing on the identified OCR region of the image data.

In one aspect, in the information processing system, the circuitry is further configured to store, at an external service system, a file including the output data.

In one aspect, in the information processing system, the circuitry is configured to output data of the OCR region in a file different from a file of the image data.

In one aspect, in the information processing system, the image data that is received is a plurality of pieces of image data. The circuitry is configured to: identify identical OCR regions of the plurality of pieces of image data; perform the OCR processing on the identical OCR regions of the plurality of pieces of image data; and output a single file including a plurality of pieces of data generated from the identical OCR regions.

In one aspect, in the information processing system, in response to receiving the plurality of pieces of image data from the device at different times, the circuitry is configured to identify the identical OCR regions of the plurality of pieces of image data at the different times.

In one aspect, in the information processing system, wherein the circuitry is configured to assign the file a file name that contains at least a part of information obtained from the OCR region of the image data.

In one aspect, in the information processing system, the circuitry is further configured to detect, in the image data, the region in which the predetermined information is detected, output, to a setting file, information on the region in which the predetermined information is detected, store the setting file at the external service system, and identify the OCR region of the image data, based on the information on the region in which the predetermined information is detected and that is included in the setting file.

In one aspect, in the information processing system, a type of the data is set for each OCR region in the setting file, and the circuitry is configured to perform the OCR processing according to the type of the data on the OCR region.

In one aspect, in the information processing system, a type of the data is set for each OCR region in the setting file, and the circuitry is further configured to correct, in accordance with the type of the data, the data obtained by the OCR processing.

In one aspect, a data output system is provided, which includes the information processing system configured to further communicate with a terminal apparatus. The terminal apparatus including terminal apparatus circuitry configured to accept selection of an application requested by the device, and selection of the setting file, and transmit, to the information processing system, identification information of the application that is selected, and identification information of the setting file The setting file is associated with the application. In response to a request for executing the application accompanied with the image data, the circuitry is configured to identify the OCR region of the image data, based on the information on the region in which the predetermined information is detected and that is included in the setting file associated with the application.

In one aspect, in the data output system, wherein the terminal apparatus circuitry is configured to accept designation of data for use in a file name of the file, from among the output data, and transmit the designated data for use in the file name to the external service system. The external service system is configured to set, in the setting file, the designated data for use in the file name.

In one aspect, in the data output system, the terminal apparatus circuitry is configured to accept selection of an application to be copied and accept an application name of an application created by copying, and transmit identification information of the application to be copied and the application name to the information processing system. The information processing system is configured to copy the application to be copied, to create a new application assigned the application name. The terminal apparatus circuitry is configured to accept selection of the new application and selection of the setting file.

In one aspect, in the data output system, the terminal apparatus circuitry is configured to accept a setting regarding detection of the region in which the predetermined information is detected. The circuitry of the information processing system is configured to detect, based on the setting, the region in which the predetermined information is detected, output, to a setting file, information on the region in which the predetermined information is detected, and identify the OCR region of the image data, based on the region in which the predetermined information is detected.

In one aspect, in the data output system, the device is an image processing apparatus having a scan function.

In one aspect, in the data output system, the device is a personal computer or a smartphone.

In one aspect, a data output method performed by a system capable of communicating with a device, includes: receiving image data from the device; identifying an OCR region of the image data, based on a region in which predetermined information is detected; and outputting data, the output data being obtained by performing OCR processing on the identified OCR region of the image data.

In one aspect, a non-transitory recording medium which, when executed by one or more processors, cause the processors to perform a data output method including: receiving image data from a device; identifying an OCR region of the image data, based on a region in which predetermined information is detected; and outputting data, the output data being obtained by performing OCR processing on the identified OCR region of the image data.

The invention claimed is:

1. A data output system comprising:
an information processing system; and
a device communicably connected with the information processing system via a network, the device including device circuitry configured to
display an icon list screen including one or more icons, and
transmit identification information of a selected icon and image data to the information processing system, in a case where a selection of an icon from among the one or more icons is received from a user, the icon being an icon of an application executed by the information processing system,
the information processing system including system circuitry configured to
store, in a memory, the identification information in association with region information indicating a region of the image data to be subjected to image processing, the application being associated with the region subjected to image processing,
obtain, from the memory, region information associated with the identification information of the selected icon, and
output a result of image processing on a region identified with the region information obtained from the memory.

2. The data output system according to claim 1, wherein the system circuitry is configured to perform OCR processing on the region indicated by the region information.

3. The data output system according to claim 1, wherein the system circuitry is configured to
associate the icon with a setting file including the region information, the setting file being stored at an external service system, and
perform image processing on the region indicated by the region information in response to the region information being included in the setting file acquired from the external service system.

4. The data output system according to claim 3,
wherein the device circuitry is configured to receive selection of an application to be copied and an application name of an application created by copying, and transmit identification information of the application to be copied as the identification information, and the application name to the information processing system, wherein the system circuitry is configured to copy the application to be copied, to create a new application assigned with the application name, and wherein the device circuitry is configured to receive selection of the new application and selection of the setting file to be associated with the new application.

5. The data output system according to claim 4, wherein a plurality of the new applications are created from the application to be copied, and wherein the device circuitry is configured to receive, for the plurality of new applications, selection of the setting files different from each other.

6. The data output system according to claim 4, wherein the identification information of the application is associated with the icon, wherein in response to the selection of the icon, the device circuitry is configured to transmit the image data and an execution request for the application associated with the icon to the information processing system, and wherein in response to the execution request of the application, the system circuitry is configured to perform image processing on the region indicated by the region information associated with the selected icon in the image data.

7. The data output system according to claim 6, wherein the device circuitry is configured to generate the image data by scanning an original, and display a name of the original in the icon.

8. The data output system according to claim 7, wherein the device circuitry is configured to display a thumbnail of the original in the icon.

9. The data output system according to claim 1, wherein the device is an image processing apparatus having a scan function.

10. The data output system according to claim 1, wherein the device is a personal computer or a smartphone.

11. An information processing system comprising circuitry configured to:

store, in a memory, region information indicating a region to be subjected to image processing in association with identification information of a selected icon;

receive the identification information of the selected icon and image data, the identification information of the selected icon corresponding with an icon, from among a number of icons, selected by a user, the icon being an icon of an application executed by the information processing system, and the application being associated with the region to be subjected to image processing;

obtain, from the memory, region information corresponding with the identification information of the selected icon; and output a result of image processing performed on a region identified with the information on the region that is obtained from the memory.

12. An image processing method comprising:

associating a region subjected to image processing with identification information of a selected icon;

receiving, in a case where a device receives a selection of an icon of a number of icons from a user, the identification information of the selected icon and image data from a device, the icon being an icon of an application executed by the information processing system and the application being associated with the region subjected to image processing; and outputting a result of the image processing performed on the image data at the region to be subjected to image processing associated with the identification information.

13. A non-transitory recording medium which, when executed by one or more processors, cause the processors to perform the image processing method of claim 12.

14. The data output system of claim 1, wherein the system circuitry is configured to determine the region information based on a highlighted portion of a document received from the device.

15. The data output system of claim 1, wherein the identification information indicates a type of document corresponding with the image data.

16. The data output system of claim 1, wherein the system circuitry is configured to store, in the memory, the identification information in association with an application name and a storage destination.

* * * * *